United States Patent
Hakuta et al.

(10) Patent No.: US 12,474,086 B2
(45) Date of Patent: Nov. 18, 2025

(54) SILENCING DEVICE AND AIR SUPPLY SYSTEM

(71) Applicant: FUJIFILM Corporation, Tokyo (JP)

(72) Inventors: Shinya Hakuta, Ashigarakami-gun (JP); Shogo Yamazoe, Ashigarakami-gun (JP); Yoshihiro Sugawara, Ashigarakami-gun (JP); Akihiko Ohtsu, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 525 days.

(21) Appl. No.: 17/870,267

(22) Filed: Jul. 21, 2022

(65) Prior Publication Data

US 2022/0357075 A1    Nov. 10, 2022

Related U.S. Application Data

(63) Continuation of application No. PCT/JP2020/041826, filed on Nov. 10, 2020.

(30) Foreign Application Priority Data

Feb. 26, 2020    (JP) .................................. 2020-030641

(51) Int. Cl.
F24F 13/24    (2006.01)

(52) U.S. Cl.
CPC ........ *F24F 13/24* (2013.01); *F24F 2013/242* (2013.01); *F24F 2013/245* (2013.01)

(58) Field of Classification Search
CPC . F24F 13/24; F24F 2013/242; F24F 2013/245

(Continued)

(56) References Cited

U.S. PATENT DOCUMENTS 4,412,147 A * 10/1983 Nagura ................. B06B 1/0688
                                                         600/443
6,215,231 B1 * 4/2001 Newnham .............. H04R 23/00
                                                         310/311

(Continued)

FOREIGN PATENT DOCUMENTS

CN           1317629 A    10/2001
CN         102686951 A     9/2012

(Continued)

OTHER PUBLICATIONS

Japanese Notice of Reasons for Refusal for Japanese Application No. 2022-503091, dated Oct. 3, 2023, with an English translation.

(Continued)

*Primary Examiner* — Avinash A Savani
*Assistant Examiner* — Ryan L Faulkner
(74) *Attorney, Agent, or Firm* — Birch, Stewart, Kolasch & Birch, LLP

(57) ABSTRACT

A silencing device and an air supply system according to an embodiment of the present invention include a resonance silencer provided at a position connected to a space in which the sound source is located within the air supply system in order to silence the noise generated from the sound source in the housing, in which in a case where a resonance wavelength of the resonance silencer alone is denoted by λ, a distance by which the resonance silencer is separated from the sound source is less than λ/2. A fundamental resonance frequency of the resonance silencer is equal to or less than an acoustic upper limit frequency determined according to a size of the housing.

18 Claims, 14 Drawing Sheets

(58) Field of Classification Search
USPC .......................................................... 454/329
See application file for complete search history.

(56) References Cited

U.S. PATENT DOCUMENTS

| | | |
|---|---|---|
| 2002/0153181 A1 | 10/2002 | Nakamura |
| 2019/0206380 A1 | 7/2019 | Hakuta et al. |
| 2020/0124320 A1 | 4/2020 | Sugawara et al. |

FOREIGN PATENT DOCUMENTS

| | | | |
|---|---|---|---|
| CN | 109520044 A | 3/2019 | |
| CN | 109690669 A | 4/2019 | |
| JP | 1-302060 A | 12/1989 | |
| JP | 9-146562 A | 6/1997 | |
| JP | 10-103728 A | 4/1998 | |
| JP | 2001-304623 A | 10/2001 | |
| JP | 2002-371998 A | 12/2002 | |
| JP | 2006-189000 A | 7/2006 | |
| JP | 2008-36065 A | 2/2008 | |
| JP | 2012-207819 A | 10/2012 | |
| JP | 2018197722 * | 10/2018 | .............. F24F 13/24 |
| JP | 6491788 B1 | 3/2019 | |
| JP | 2019-53284 A | 4/2019 | |
| TW | M481294 U | 7/2014 | |
| WO | WO 2014/006650 A1 | 1/2014 | |
| WO | WO 2019/009338 A1 | 1/2019 | |

OTHER PUBLICATIONS

Chinese Office Action and Search Report for Chinese Application No. 202080095645.1, dated Nov. 19, 2024, with an English translation.
International Preliminary Report on Patentability and English translation of the Written Opinion of the International Searching Authority for International Application No. PCT/JP2020/041826, dated Sep. 9, 2022.
International Search Report for International Application No. PCT/JP2020/041826, dated Feb. 16, 2021, with English translation.
Japanese Decision of Refusal for Japanese Application No. 2022-503091, dated Jan. 23, 2024, with an English translation.
Extended European Search Report for European Application No. 20921111.9, dated Jun. 30, 2023.
Chinese Office Action and Search Report for corresponding Chinese Application No. 202080095645.1, dated Apr. 30, 2025, with English translation.
European Communication pursuant to Article 94(3) EPC for corresponding European Application No. 20 921 111.9, dated Apr. 11, 2025.

* cited by examiner

SOUND PRESSURE LEVEL AT 403 Hz

LOGARITHMIC LOCAL VELOCITY AT 403 Hz

SILENCING DEVICE AND AIR SUPPLY SYSTEM

CROSS-REFERENCE TO RELATED APPLICATIONS

This application is a Continuation of PCT International Application No. PCT/JP2020/041826 filed on Nov. 10, 2020, which claims priority under 35 U.S.C § 119(a) to Japanese Patent Application No. 2020-030641 filed on Feb. 26, 2020. Each of the above application(s) is hereby expressly incorporated by reference, in its entirety, into the present application.

BACKGROUND OF THE INVENTION

1. Field of the Invention

The present invention relates to a silencing device, and particularly relates to a silencing device used for an air supply system having a housing to silence noise generated from a sound source in the housing. In addition, the present invention relates to an air supply system comprising the above-described silencing device.

2. Description of the Related Art

In an air supply system such as a blower for air conditioning, a silencer may be disposed in an air flow passage (ventilation passage) in order to reduce noise such as mechanical noise. As an example, the technique disclosed in JP2008-036065A can be mentioned. This technique uses a resonance silencer to silence sound generated from an electric blower.

Specifically, the electric blower of JP2008-036065A comprises an impeller having a plurality of blades, an air guide having a plurality of stationary blades disposed around the impeller, an electric motor that drives a rotating shaft to which the impeller is fixed, and a substantially cylindrical fan case having an intake port for allowing airflow into the impeller in the center and an exhaust port on a side surface, and fixed to the electric motor in a state of including the impeller and the air guide. In addition, the above-described electric blower further comprises a soundproof cylinder having an exhaust port and airtightly fixed to the fan case in a state of including the entire electric motor, a substantially cylindrical silencing unit having a recess portion having a predetermined width and depth on the circumference and provided at a predetermined location on a surface of the electric motor, and a thin film portion having flexibility, which is provided on an opening end surface of the recess portion of the silencing unit. With such a configuration, in the above-described electric blower, sound of a specific frequency determined in accordance with the depth of the recess portion can be silenced by resonating.

SUMMARY OF THE INVENTION

In the air supply system, noise is generated over a wide band, and it is difficult to silence the noise, particularly the low frequency side sound of 1 kHz or less, with a sound absorbing material in the related art which is made of a porous material or the like. In addition, in an ordinary resonance silencer such as the resonance silencer disclosed in JP2008-036065A, the sound of a single frequency coinciding with a resonance frequency is silenced, so that the sound is silenced in a narrow band. That is, an ordinary resonance silencer cannot sufficiently silence the noise in the air supply system, and therefore, a technique for silencing the low frequency side sound in a wide band is required.

An object of the present invention is to provide a silencing device capable of silencing, in a wide band, low frequency side sound of noise generated from a sound source in a housing of an air supply system by solving the above-described problems of the related art.

Another object of the present invention is to provide an air supply system comprising the silencing device.

As a result of a thorough examination conducted to achieve the objects, the present inventors have found that the objects are achieved by the following configuration.

[1] A silencing device that is used in an air supply system having a housing, to silence noise generated from a sound source in the housing, the device comprising: a resonance silencer provided at a position connected to a space within the air supply system in which the sound source is located, in which, in a case where a resonance wavelength of the resonance silencer alone is denoted by $\lambda$, a distance by which the resonance silencer is separated from the sound source is less than $\lambda/2$, and a fundamental resonance frequency of the resonance silencer is equal to or less than an acoustic upper limit frequency determined according to a size of the housing.

[2] The silencing device according to [1], in which first silencing, which is silencing by resonance of the resonance silencer, silences the noise, and the first silencing is fundamental resonance of the resonance silencer.

[3] The silencing device according to [2], in which a portion of the resonance silencer that acts on the noise includes an end portion of the resonance silencer as a portion closest to the sound source, the noise is silenced by the first silencing and second silencing by interference of reflected sound produced by reflection of the noise by the resonance silencer with the noise in a region between the sound source and the end portion of the resonance silencer, and a frequency of the second silencing is higher than a frequency of the first silencing.

[4] The silencing device according to any one of [1] to [3], in which an inside of the resonance silencer communicates with the space in which the sound source is located.

[5] The silencing device according to any one of [1] to [4], in which a ventilation portion that allows air to be supplied in the air supply system to pass therethrough is provided.

[6] The silencing device according to any one of [1] to [5], in which an insert consisting of at least one of a foam material, a nonwoven fabric, or a porous material is disposed inside the resonance silencer.

[7] The silencing device according to any one of [1] to [6], further comprising: a silencing body different from the resonance silencer.

[8] The silencing device according to [7], in which a portion of the resonance silencer that acts on the noise includes an end portion of the resonance silencer as a portion closest to the sound source, and the silencing body is disposed in a region between the sound source and the end portion of the resonance silencer.

[9] The silencing device according to [7] or [8], in which the silencing body is formed of at least one of a foam material, a nonwoven fabric, or a porous material.

[10] The silencing device according to any one of [7] to [9], in which the silencing body is disposed on an outside of a ventilation portion that allows air to be supplied in the air supply system to pass therethrough.

[11] An air supply system comprising: an air supply system main body including a sound source inside a housing; and the silencing device according to any one of [1] to [10].

[12] The air supply system according to [11], in which the air supply system main body supplies air by rotation of a rotating body.

[13] The air supply system according to [12], in which noise generated from the sound source in the housing includes noise caused by the rotation of the rotating body.

[14] The air supply system according to any one of [11] to [13], in which the air supply system main body takes in air from a first end side of the air supply system main body and discharges air on a second end side of the air supply system main body, and the silencing device is disposed at least on the second end side out of a first end and a second end of the air supply system main body.

[15] The air supply system according to [14], in which the silencing device is disposed on each of the first end side and the second end side of the air supply system main body.

[16] The air supply system according to any one of [11] to [15], in which the air supply system main body further includes a rotor of an axial fan, the silencing device is provided with a ventilation portion that allows air to be supplied by the axial fan to pass therethrough, and an area of a cross section of the ventilation portion perpendicular to a rotating shaft of the axial fan is smaller than an area of a circle surrounded by a trajectory through which a blade tip of the rotor farthest away from the rotating shaft passes during rotation of the axial fan.

[17] The air supply system according to any one of [11] to [16], in which a portion of the resonance silencer that acts on the noise includes an end portion of the resonance silencer as a portion closest to the sound source, the air supply system main body further includes a rotor of an axial fan, the silencing device includes a silencing body different from the resonance silencer, and the silencing body is closer to the rotor than the end portion of the resonance silencer.

[18] The air supply system according to any one of [11] to [17], in which the air supply system main body is a blower.

[19] The air supply system according to [18], in which a heat exchanger is provided in the air supply system main body.

[20] The air supply system according to any one of [11] to [19], in which the air supply system main body further includes a rotor of an axial fan, the resonance silencer is an air column resonance type resonator having an opening portion, the silencing device has a first end wall and a second end wall disposed opposite to each other in an axial direction of a rotating shaft of the axial fan, a ventilation hole is provided in a central portion of each of the first end wall and the second end wall, a peripheral portion of the ventilation hole in the second end wall is recessed to a first end wall side, a silencing body formed of at least one of a foam material, a nonwoven fabric, or a porous material is disposed in a recess portion formed by the recessed peripheral portion of the ventilation hole in the second end wall, and the silencing body is closer to the rotor than the opening portion.

According to the present invention, it is possible to provide a silencing device capable of silencing, in a wide band, low frequency side sound of noise generated from a sound source in a housing of an air supply system, and an air supply system comprising such a silencing device.

DESCRIPTION OF THE PREFERRED EMBODIMENTS

Figure 1:
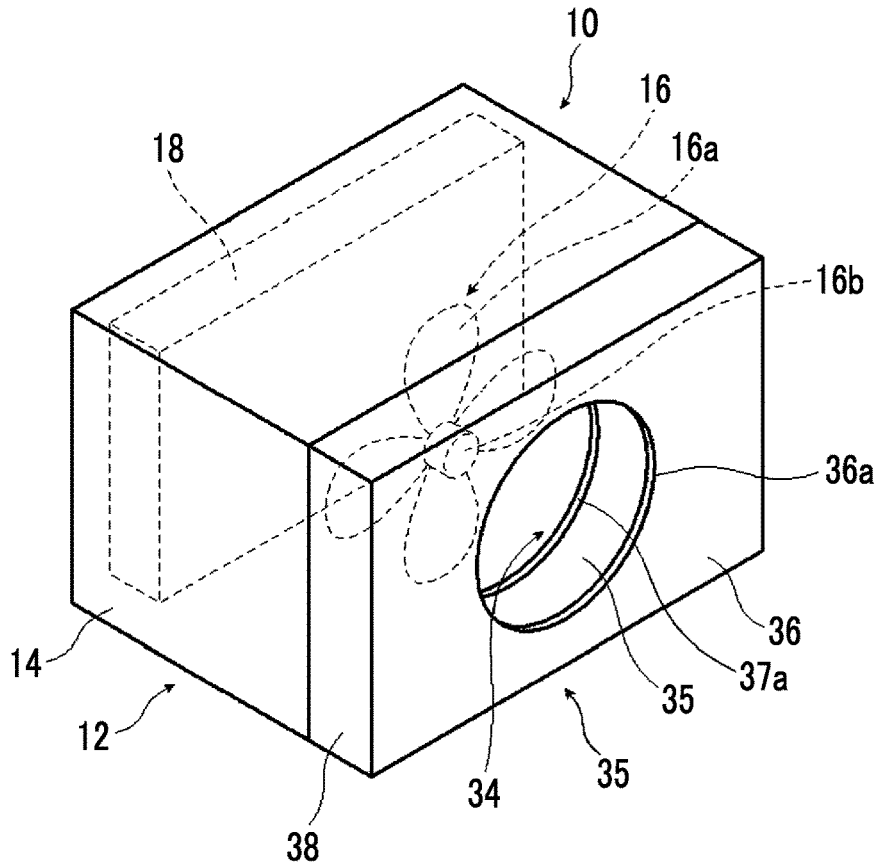
FIG. 1 is a perspective view schematically showing an air supply system according to an embodiment of the present invention.

Hereinafter, the details of the present invention will be described. The description of configuration requirements described below may be made based on typical embodiments of the present invention, but the invention is not limited to such embodiments.

In the present specification, the numerical range represented by the term "to" means a range including numerical values described before and after the term "to" as a lower limit value and an upper limit value.

In addition, in the present specification, the terms "orthogonal", "parallel", "perpendicular" include a range of generally allowable errors in the technical field to which the present invention belongs. For example, the term "orthogonal" includes a state of deviation within a range of less than ±10° with respect to the exact orthogonality, and an error with respect to the exact orthogonality is preferably 3° or less.

Angles referred to in the following description may also be allowed to deviate within a range of less than ±10° with respect to the exact angle.

In the present specification, the terms "the same", "identical" and "coinciding" include a range of generally allowable errors in the technical field to which the present invention belongs.

[Regarding Silencing Device According to Embodiment of Present Invention]

A silencing device according to the embodiment of the present invention is a silencing device used for an air supply system having a housing to silence noise generated from a sound source in the housing. In addition, the silencing device according to the embodiment of the present invention comprises a resonance silencer provided at a position connected to a space within the air supply system in which the sound source is located. Here, the fact that the resonance silencer is connected to the space in which the sound source is located means that the resonance silencer exists in a space (sound field space) where the noise emitted from the sound source is transmitted. For example, in a case where the resonance silencer is an air column resonance type or Helmholtz resonance type resonator, it means that an opening portion thereof communicates with an inside of the housing. Alternatively, in a case where the resonance silencer is a film type resonator, it means that a space facing a film surface and the inside of the housing communicate with each other.

In the aspect in which the resonance silencer is connected to the space in which the sound source is located, a porous sound absorbing material or a structure made of an air-permeable material such as cloth or nonwoven fabric may be interposed at an intermediate position.

In a system provided with a fan for air supply, the sound source is located at a tip of a rotor of the fan (hereinafter, also referred to as blade tip). Incidentally, the position of the sound source can be specified by imaging the sound field space with an acoustic camera. In addition, an ordinary microphone may be installed near the position assumed to be the sound source (for example, the rotor of the fan), sound source may be measured while changing the position of the microphone, and the position of the sound source may be specified from a position where a sound pressure level increases.

In the silencing device according to the embodiment of the present invention, in a case where a resonance wavelength of the resonance silencer alone is denoted by $\lambda$, a distance by which the resonance silencer is separated from the sound source, that is, a distance between the resonance silencer and the sound source is less than $\lambda/2$.

The resonance wavelength $\lambda$, of the resonance silencer alone can be defined as $\lambda=C0/fr$, where a transmission loss peak frequency in a case where a plane wave is incident into the resonance silencer alone is denoted by fr (Hz). Here, C0 is a sound velocity (m/s). As an experimental method for measuring silencer characteristics using an acoustic plane wave, there is an acoustic tube method, and transmission loss can be measured by a 4-microphone transfer function method (specified in ASTM2611E). A fundamental resonance frequency (that is, the lowest-order resonance frequency) can be obtained from a peak frequency of the measured transmission loss, and the resonance frequency $\lambda$ can be obtained from the above equation.

Figure 4:
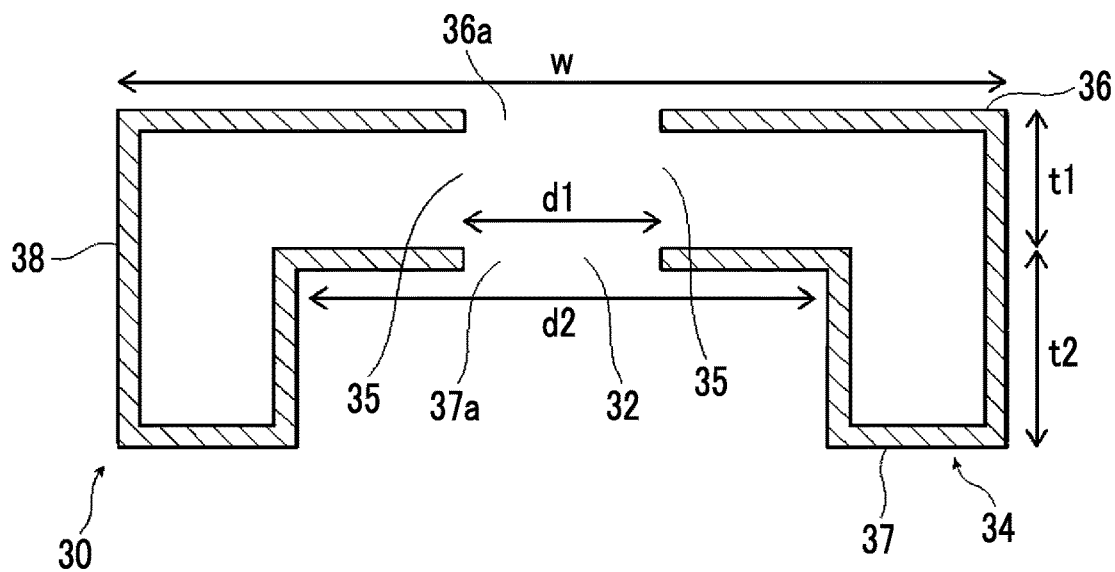
FIG. 4 is a diagram showing a cut surface in a case where a silencing device is cut in a J-J cross section in FIG. 2.

As shown in FIG. 4, which will be referred to below, in a case where a resonance silencer has an opening portion and is formed from a side wall portion, an acoustic tube of the size of the opening portion is connected to the opening portion, and measurement can be performed in a configuration in which the resonance silencer exists in the side wall portion. Similarly, for a resonance silencer formed with a ventilation portion open, measurement can be performed by the same disposition as described above with respect to the acoustic tube.

The distance between the resonance silencer and the sound source is a distance between an end portion of the resonance silencer and the sound source. The end portion of the resonance silencer is a portion closest to the sound source among parts of the resonance silencer that act on the noise. In a case where the resonance silencer is an air column resonance type or Helmholtz resonance type resonator, a portion of the opening portion of the resonator that is closest to the sound source corresponds to the end portion, and in a case where the resonance silencer is a film type resonator, a portion of a film surface that is closest to the sound source corresponds to the end portion.

In the silencing device according to the embodiment of the present invention, the fundamental resonance frequency (resonance frequency in a primary mode) of the resonance silencer is equal to or less than an acoustic upper limit frequency determined according to the size of the housing.

The acoustic upper limit frequency is specified in JIS A 1405-2:2007 "Measurement of sound absorption coefficient and impedance by acoustic tube-Part 2: Transfer function method". In a case where the housing is a circular tube, an equation of $fu<0.58\times c0/d$ is established, where an inner diameter of the tube is denoted by d (m), a sound velocity is denoted by c0 (m/s), and the acoustic upper limit frequency is denoted by fu (Hz). In addition, in a case where the housing is a square tube, an equation of $fu<0.50\times c0/d$ is established, where the maximum cross-sectional dimension is denoted by d (m).

The acoustic upper limit frequency indicates an upper limit of a frequency at which an acoustic mode other than the plane wave does not exist, that is, an upper limit of a frequency at which only the plane wave can propagate. A natural acoustic mode of not only the acoustic tube but also a general propagation tube including the shape of the housing of the present invention is determined by the size and shape of the tube. For the circular tube and the square tube, the mode is obtained by the equation, and for other shapes, the tube is modeled, for example, by an acoustic finite element method and eigenvalue analysis is performed to obtain an acoustic eigenmode of the lowest-order, whereby a frequency at the obtained mode can be set as the acoustic upper limit frequency.

As described above, in the silencing device according to the embodiment of the present invention, it is possible to silence, in a wide band, low frequency side sound of 1 kHz or less of the noise emitted from the sound source in the housing. This is because the silencing device according to the embodiment of the present invention silences the noise by silencing using resonance of the resonance silencer as a dominant factor (hereinafter, referred to as "first silencing") and silencing using near-field interference in a region between the sound source and the end portion of the resonance silencer as a dominant factor (hereinafter, referred to as "second silencing"). The first silencing is fundamental resonance of the resonance silencer, that is, lowest-order resonance.

A near-field region is a region in the extreme vicinity of the sound source where the sound is generated, and is such a region in the vicinity of the sound source that a high wave number component attenuating without propagating far does not attenuate. Here, in a case where a sound velocity is denoted by c0, a frequency thereof is denoted by f0, and the corresponding wave number k0 ($=2\pi \times f0/c0$) is defined, the component attenuates spatially and exponentially as derived from the wave equation in a range of the high wave number where the wave number k>k0. This high wave number component is called near-field sound. The near-field region is a region in which the near-field sound also contributes to interference. The near-field sound attenuates at a wavelength of about $\lambda$. In addition, since reciprocation of the sound is required due to the interference, a distance for determining the near-field region is defined as $\lambda/2$ not $\lambda$. Therefore, in the present embodiment, a region where the distance from the sound source is less than $\lambda/2$ along an air flow passage in the air supply system corresponds to the near-field region.

The near-field interference is interference that occurs in the above-mentioned near-field region, and in the present invention, it refers to interference including the near-field sound between the sound source and the resonance silencer. That is, it is interference of reflected sound of the resonance silencer with radiated sound from the sound source. The interference including the near field increases the effect of the interference on the far field, and the interference affects the sound source, so that the radiated sound from the sound source can be suppressed compared with the interference in the far field.

The frequency of the first silencing and the frequency of the second silencing are different from each other, but both are within a frequency band where the sound pressure is relatively high on the low frequency side of 1 kHz or less in sound pressure distribution (spectrum) in the housing determined by the shape and size of the housing. Specifically, the frequency of the first silencing is a fundamental resonance frequency of the resonance silencer, and the frequency of the second silencing is higher than the frequency of the first silencing (see FIG. 10).

A silencing mechanism of the silencing device according to the embodiment of the present invention will be described again in the below section.

[Configuration of Air Supply System According to Embodiment of Present Invention]

Figure 2:
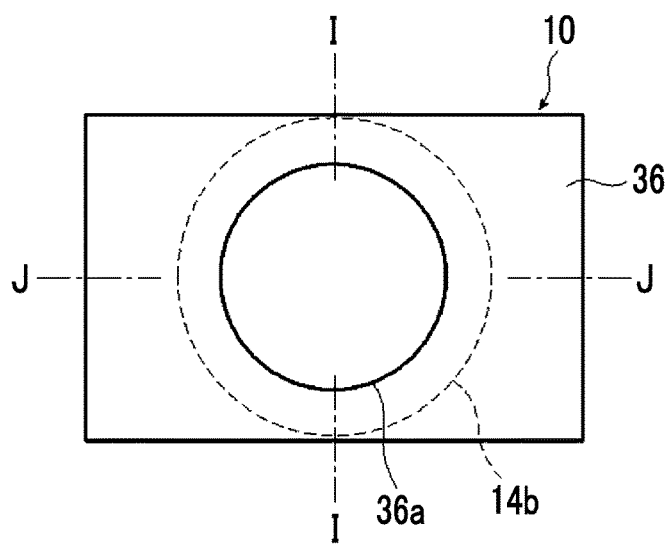
FIG. 2 is a front view of the air supply system illustrated in FIG. 1.
Figure 3:
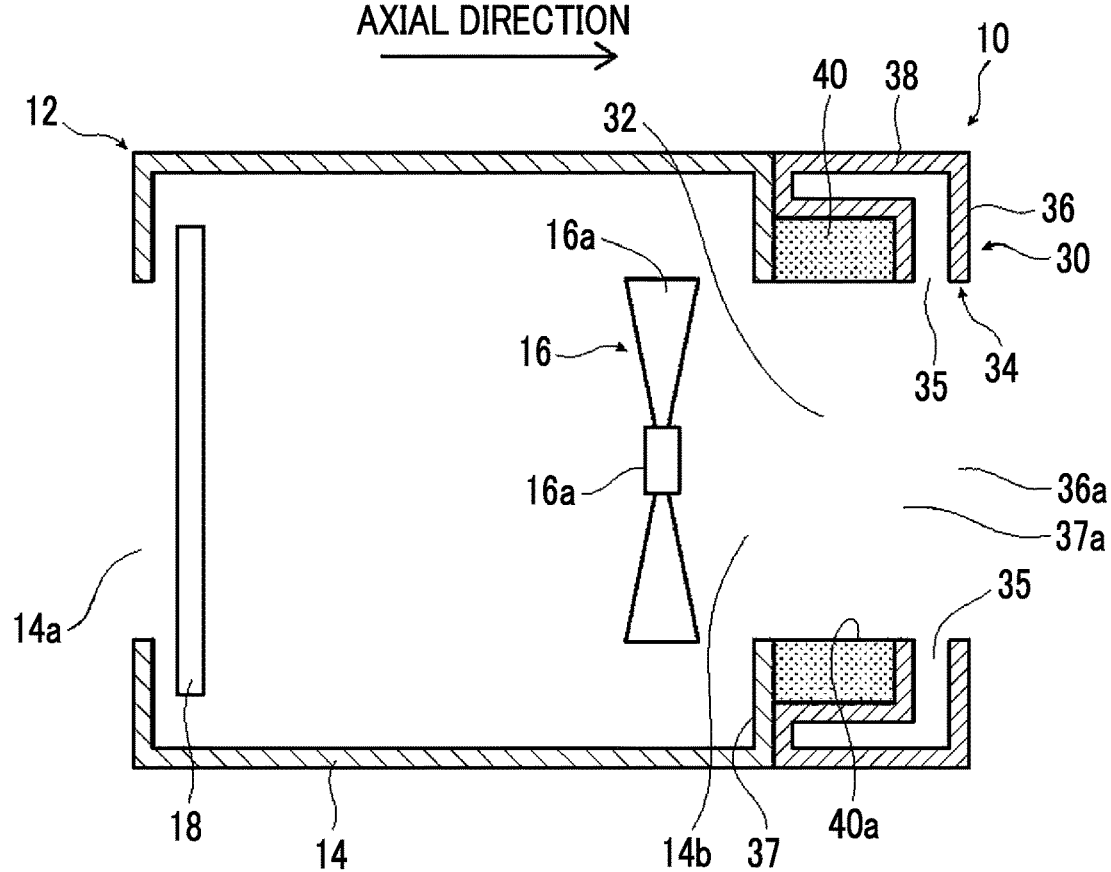
FIG. 3 is a diagram showing an I-I cross section in FIG. 2.

A configuration of an air supply system according to the embodiment of the present invention will be described with reference to suitable specific examples shown in FIGS. 1 to 4. FIG. 1 is a perspective view schematically showing an air supply system (hereinafter, an air supply system 10) according to an embodiment of the present invention. FIG. 2 is a front view of the air supply system 10 illustrated in FIG. 1. FIG. 3 is a diagram showing an I-I cross section in FIG. 2. FIG. 4 is a diagram showing a cut surface in a case where a silencing device 30 is cut in a J-J cross section in FIG. 2. In FIG. 4, a silencing body 40 described below is not shown.

The air supply system 10 is used to supply air to a predetermined air supply destination, and has an air supply system main body 12 and a silencing device 30 as shown in FIG. 1.

Hereinafter, each of the air supply system main body 12 and the silencing device 30 will be described.

(Air Supply System Main Body)

As shown in FIGS. 1 and 3, the air supply system main body 12 has a housing 14 surrounding the sound source, and supplies air by rotation of a rotating body provided in the housing 14. For example, the air supply system main body 12 is a blower, particularly a blower for air conditioning, and has an axial fan 16 as a rotating body.

The axial fan 16 is a known axial fan and has a rotor 16a having a plurality of blades. The rotor 16a has a plurality of blades, and the rotor 16a shown in FIGS. 1 and 3 has, for example, four blades. Note that the number of blades is not particularly limited. As the shape of the blades of the rotor 16a, the same shape as that used in a known axial fan can be adopted.

In the following, an axial direction of a rotating shaft 16b is simply referred to as "axial direction", and a radial direction of the rotating shaft 16b is simply referred to as "radial direction".

The housing 14 is a box-shaped or cylindrical casing and has a size sufficient to surround the entire axial fan 16. In addition, an intake port 14a is provided at a first end (strictly speaking, an end on an upstream side in an air supply direction) which is one end of the housing 14 in the axial direction, and an exhaust port 14b formed of a circular hole is provided at a second end (strictly speaking, an end on a downstream side in the air supply direction) which is the other end. In a case where a center line of the rotating shaft 16b of the axial fan 16 is extended, a center position of the exhaust port 14b is located on the extended center line.

The intake port 14a and the exhaust port 14b may have the same size or different sizes from each other.

Inside the housing 14 (that is, inside the air supply system main body 12), a heat exchanger 18 shown in FIGS. 1 and 3 is disposed on the upstream side of the axial fan 16. The heat exchanger 18 is formed of, for example, a fin coil, a fin tube, or a heat exchange plate, and exchanges heat with the air that has entered the housing 14 from the intake port 14a to increase or reduce a temperature of the air. As described above, since the heat exchanger 18 is a member for ventilating wind and air, it allows sound to pass therethrough without blocking the sound.

In the air supply system main body 12 having the configuration described above, the axial fan 16 is rotated by a motor (not shown) to impart kinetic energy to the air, so that the air is supplied in the axial direction of the rotating shaft 16b. In this case, the air supply system main body 12 takes in air from the intake port 14a provided on the first end side, increases or cools the air taken in by the heat exchanger 18, and discharges the air through the exhaust port 14b provided on the second end side. As a result, the temperature-controlled air is supplied to a predetermined air supply destination.

As an accessory of the air supply system main body 12, a tubular adapter (not shown) extending to the air supply destination may be attached to the exhaust port 14b, and air may be supplied through the adapter.

Then, in the air supply system main body 12, in a case where the axial fan 16 rotates in the housing 14, noise caused by the rotating blade cutting the air (noise called fluid mechanical noise or aerodynamic noise) is generated from a blade tip of the rotor 16a. That is, the noise generated from the sound source in the housing 14 includes the noise caused by the rotation of the axial fan 16 which is a rotating body.

The blade tip of the rotor 16a is a part of the rotor 16a that is farthest away from the rotating shaft 16b.

The above noise, together with the air to be supplied, passes through the exhaust port 14b and is discharged to the outside of the housing 14. In addition, the noise caused by the rotation of the axial fan 16 in the housing 14 has a large sound pressure over a wide band on the low frequency side (broad sound pressure distribution).

On the other hand, as shown in FIGS. 1 and 3, the silencing device 30 is attached to a downstream wall surface (that is, the second end side of the air supply system main body 12) of the housing 14, and the noise that has passed through the exhaust port 14b is silenced by the silencing device 30, and the sound pressure on the low frequency side is mainly reduced.

In the above example, the air supply system main body 12 is a blower, but the present invention is not limited thereto, and the air supply system main body may be a compressor, an exhauster, a vacuum pump, or the like. The air supply system main body 12 can also be used in a variety of applications, including indoor and outdoor units of an air conditioner for heating and cooling, a car air conditioner, an air purifier, a ventilation fan, a fan, a circulator, a dehumidifier, a humidifier, a jet engine, a cooling fan for a computer or a server computer, other cooling fans, a windmill, and the like.

In the above example, the rotating body included in the air supply system main body 12 is the axial fan 16, but the fan as the rotating body may be, for example, a centrifugal fan, a backward curved fan (turbo fan), an airfoil fan, a radial fan, a paddle fan, a multi-blade fan (sirocco fan), a tubular centrifugal fan, a mixed flow fan, an axial fan, a vane axial fan, a tube axial fan, a propeller fan, a reversal axial fan, a transverse flow fan (cross flow fan), or a vortex flow fan.

The rotating body is not limited to the fan, and may be a blower used for a turbo compressor and a turbo blower, a compressor, or the like. As a matter of course, an air supply system main body formed of a rotating body other than the above-mentioned types may be used.

(Silencing Device)

The silencing device 30 silences noise generated by the sound source in the housing 14 of the air supply system main body 12, specifically, noise caused by the rotor 16a of the axial fan 16 cutting air during rotation (fluid mechanical noise or aerodynamic noise).

The silencing device 30 has a substantially rectangular shape as shown in FIG. 2 in a front view, and has a concave shape as shown in FIG. 4 in a plan view. The silencing device 30 is disposed at least on the second end side of the air supply system main body 12, and is attached to the end surface on the discharge side of the housing 14. Although the form is different from the form shown in FIG. 1, the silencing device 30 may be disposed on each of the first end side and the second end side of the air supply system main body 12.

The silencing device 30 has a cavity portion for ventilation (that is, a ventilation portion 32 described below), and the cavity portion is attached and fixed to the housing 14 in a state of communicating with the inside of the housing 14. Means for fixing the silencing device 30 to the housing 14 is not particularly limited, and for example, the silencing device 30 may be adhered to the end surface of the housing 14 by an adhesive or an adhesion tape, or the silencing device 30 may be fixed to the housing 14 by a fastener such as a screw or a bolt. The silencing device 30 may be fixed to the housing 14 by providing a projecting portion such as a protrusion on one of the silencing device 30 and the housing 14, providing a recess portion such as an insertion hole on the other, and inserting the projecting portion into the recess portion to engage the both portions. In a case where a tubular adapter is attached to the exhaust port 14b of the housing 14, the silencing device 30 may be fixed to the housing 14 by fitting the tubular adapter into the cavity portion of the silencing device 30.

As shown in FIG. 3, the silencing device 30 has a ventilation portion 32 formed of a cavity portion penetrating the silencing device 30 in the axial direction, and a resonance silencer 34 disposed around the ventilation portion 32. The resonance silencer 34 is, for example, an air column resonance type resonator, and in the form shown in FIG. 3, a pipe line forming an inner space thereof is bent in an L-shape, extends outward in the radial direction, then bends substantially perpendicularly, and extends in the axial direction.

The silencing device 30 of the present embodiment has a first end wall 36, a second end wall 37, and a side wall 38, and an air column resonance type resonator is constructed by using these walls. Specifically, the first end wall 36 is a rectangular plate disposed at an end position on the discharge side (side opposite to the housing 14 in the axial direction) of the silencing device 30. The second end wall 37 is a rectangular plate having an outer edge of the same size as the first end wall 36, which is disposed at an end position on the side opposite to the first end wall 36 (on the side of the housing 14). The side wall 38 is a square tubular portion that connects the first end wall 36 and the second end wall 37 in the axial direction.

As shown in FIGS. 2 and 3, circular or rectangular ventilation holes 36a and 37a are provided in central portions of the first end wall 36 and the second end wall 37, respectively. A substantially cylindrical cavity portion extending between both ends in the axial direction of the silencing device 30 forms the ventilation portion 32. Center positions of the ventilation holes 36a and 37a are on the same straight line, and, for example, in a case where the center line of the rotating shaft 16b of the axial fan 16 is extended, the ventilation holes 36a and 37a may be located on the extension line. The two ventilation holes 36a and 37a preferably have the same diameter, but may have different diameters.

As shown in FIG. 4, a peripheral portion of the ventilation hole 37a of the second end wall 37 is recessed toward the first end wall 36 side to form a recess. The first end wall 36, the second end wall 37, and the side wall 38 having the configuration described above constitute an air column resonance type resonator having an L-shaped pipe line cross section. That is, the first end wall 36 and the second end wall 37 form both ends of the air column resonance type resonator in the axial direction.

A portion of the second end wall 37 that is located closest to the axial fan 16 side in the axial direction may be configured by using an outer wall of the housing 14 of the air supply system main body 12 (specifically, an outer wall on the discharge side).

As shown in FIGS. 3 and 4, a gap between an edge portion of the ventilation hole 36a of the first end wall 36 and an edge portion of the ventilation hole 37a of the second end wall 37 forms an opening portion 35 of the air column resonance resonator. The opening portion 35 corresponds to a portion of the air column resonance type resonator that acts on the noise. An end of the opening portion 35 on the side closest to the sound source corresponds to an end portion of the resonance silencer 34. A distance (distance in the axial direction) between the blade tip of the rotor 16a of the axial fan 16, that is, the sound source and the end portion of the resonance silencer 34 is less than λ/2 as described above, and is more preferably less than λ/4, and still more preferably λ/6 or less.

The inner space of the resonance silencer 34 is a space surrounded by the first end wall 36, the second end wall 37, and the side wall 38, and communicates with the inside of the housing 14, that is, the space in which the sound source is located, through the opening portion 35. The noise generated on the air supply system main body 12 side enters the resonance silencer 34 through the opening portion 35.

The ventilation portion 32 is a cavity portion provided for allowing air to be supplied in the air supply system 10, specifically, airflow generated by the rotation of the axial fan 16 to pass therethrough, and penetrates the silencing device 30 as shown in FIGS. 3 and 4. The ventilation portion 32 extends straight along the axial direction and communicates with the inside of the housing 14 of the air supply system main body 12, and is connected to the exhaust port 14b (opening on the discharge side) of the housing 14 as shown in FIG. 3.

The ventilation portion 32 has the same diameter as the exhaust port 14b or a smaller diameter than the exhaust port 14b. In addition, as shown in FIG. 3, the diameter of the ventilation portion 32 may be substantially the same as an outer diameter of the rotor 16a of the axial fan 16. Here, the outer diameter of the rotor is a diameter of a circle surrounded by a trajectory (hereinafter, referred to as a circular trajectory) through which the blade tip of the rotor 16a of the axial fan 16 passes during rotation of the axial fan 16. In other words, an area of the cross section of the ventilation portion 32 (strictly speaking, an area of the cross section perpendicular to the rotating shaft 16b of the axial fan 16) may be the same as an area of the circular trajectory.

Figure 5:
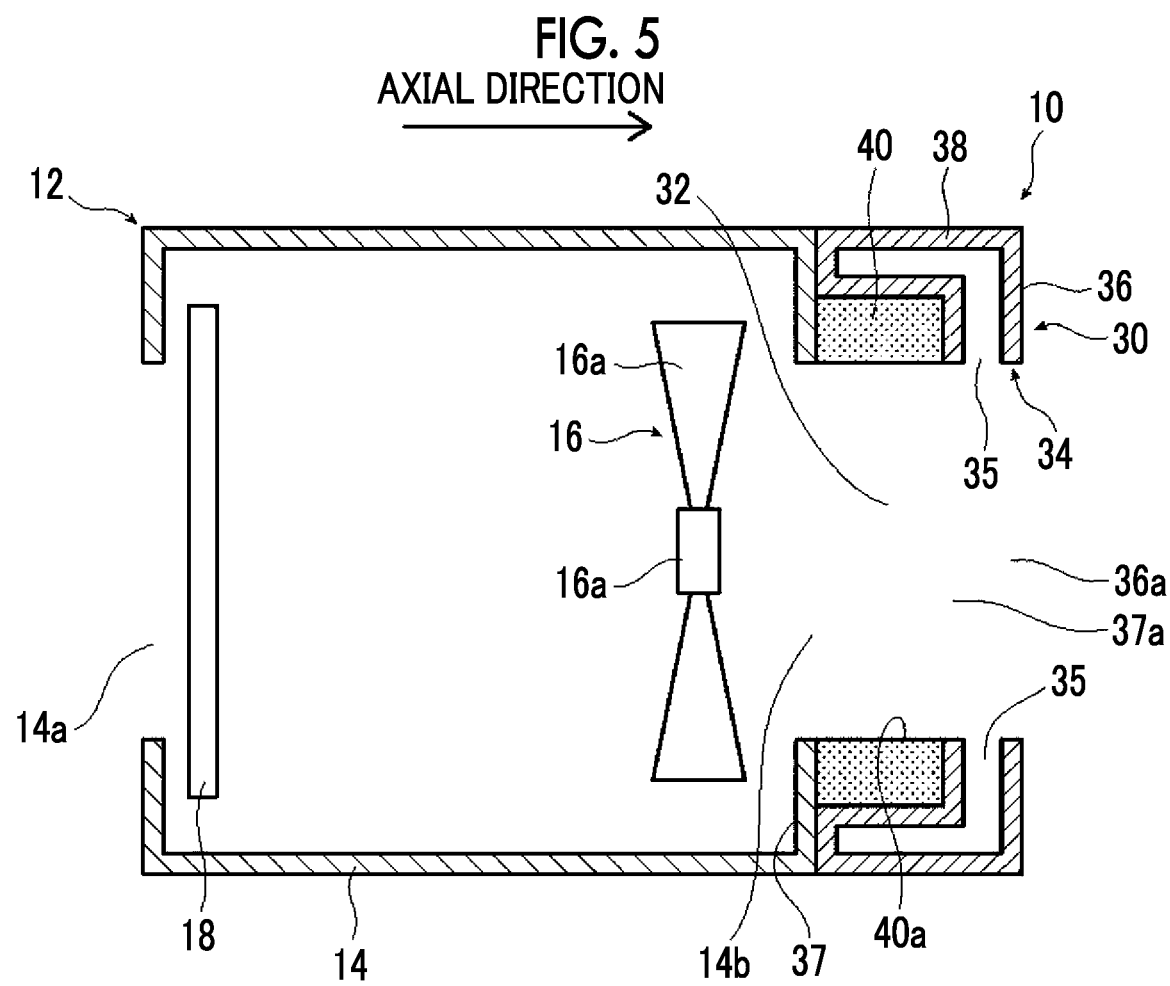
FIG. 5 is a cross-sectional view of an air supply system according to a first modification example.

As shown in FIG. 5, the area of the cross section of the ventilation portion 32 may be smaller than the area of the orbital circle. In this case, the reduction of the cross-sectional area has the effect of reducing a noise volume, and by devising the shape of an intermediate portion, it is possible to secure the amount of air supply without impeding the flow of the airflow generated by the axial fan 16 as much as possible. For example, it is desirable to continuously connect the shape of the silencing body 40 or the shape of the wall from the axial fan 16 to the ventilation portion 32 by an oblique structure (for example, a tapered shape).

The resonance silencer 34 is disposed at a position surrounding the ventilation portion 32, and is disposed at a position where the flow of air in the ventilation portion 32 is not blocked. The opening portion 35 of the resonance silencer 34 is disposed at a position facing the ventilation portion 32 in the radial direction, and is continuously provided in an annular shape along the edges of the ventilation holes 36a and 37a. Note that the present invention is not limited to this, and the opening portion 35 may be formed discontinuously at a constant pitch in a circumferential direction of the ventilation portion 32 (direction along the edges of the ventilation holes 36a and 37a).

The resonance silencer 34 is not limited to the air column resonance type resonator, and may be a Helmholtz resonance type resonator. Whether the resonance silencer 34 is of the air column resonance type or the Helmholtz resonance type is determined according to the size and position of the opening portion 35, the size of the inner space of the resonator, and the like. Therefore, by adjusting these appropriately, it is possible to select whether the air column resonance or the Helmholtz resonance is adopted as the resonance structure.

In a case where the resonance silencer 34 is of the air column resonance type, it is preferable that the opening portion 35 is wide to some extent because in a case where the opening portion 35 is narrow, the sound wave is reflected at the opening portion 35 and it is difficult for the sound wave to enter the inner space. Specifically, a width (length in axial direction) of the opening portion 35 is preferably 1 mm or more, more preferably 3 mm or more, and still more preferably 5 mm or more. In a case where the opening portion 35 is circular, the diameter is preferably in the range described above.

The resonance silencer 34 may be a film-type resonance type resonator. In this case, the resonance silencer 34 has a frame and a film supported by the frame in a vibratable state, comprises a back space surrounded by the frame body and the film, and resonates by the vibration of the film. The film-type resonance type resonator is disposed at a position where the flow of air in the ventilation portion 32 is not blocked, and the film is disposed substantially parallel to the axial direction and faces inward in the radial direction.

The resonance silencer 34 may be any one of an air column resonance type resonator, a Helmholtz resonance type resonator, or a film type resonator, or may be a combination of two or three of these.

Here, the material of each portion (for example, the first end wall 36, the second end wall 37, and the side wall 38) in a case where the resonance silencer 34 is a film-type resonance type or Helmholtz resonance type resonator, and the material of the frame in a case where the resonance silencer 34 is a film type resonator are collectively referred to as a "frame material". Examples of the frame material include a metal material, a resin material, a reinforced plastic material, and a carbon fiber.

Examples of the metal material include aluminum, titanium, magnesium, tungsten, iron, steel, chromium, chromium molybdenum, nichrome molybdenum, copper, stainless, and alloys thereof. It is also possible to process so-called sheet metal to form the shape of the frame material.

Examples of the resin material include an acrylic resin, polymethyl methacrylate, polycarbonate, polyamideid, polyarylate, polyetherimide, polyacetal, polyetheretherketone, polyphenylene sulfide, polysulfone, polyethylene terephthalate, polybutylene terephthalate, polyimide, an acrylonitrile-butadiene-styrene copolymer synthetic resin (ABS resin), polypropylene, and triacetyl cellulose.

Examples of the reinforced plastic material include carbon fiber reinforced plastics (CFRP) and glass fiber reinforced plastics (GFRP).

Natural rubber, chloroprene rubber, butyl rubber, ethylene propylene diene rubber (EPDM), silicone rubber, and the like, and rubbers having a crosslinked structure thereof may be used as the frame material.

In addition, as the frame material, a honeycomb core material can be used as the frame material. Since the honeycomb core material is lightweight and used as a highly rigid material, ready-made product thereof is easily available. Specifically, a honeycomb core material made of various materials such as aluminum honeycomb core, FRP honeycomb core, paper honeycomb core (manufactured by Shin Nippon Feather Core Co., Ltd, manufactured by Showa Aircraft Group Co., Ltd., or the like), and thermoplastic resin honeycomb core (TECCELL manufactured by Gifu Plastic Industry Co., Ltd., or the like) can be used as the frame material.

A structure including air, specifically, a foam material, a hollow material, or a porous material may also be used as the frame material. In a case where a large number of resonators are configured, for example, a closed-cell foam material may be used in order to prevent ventilation between the resonators. Specifically, various materials such as closed-cell polyurethane, closed-cell polystyrene, closed-cell polypropylene, closed-cell polyethylene, and closed-cell rubber sponge can be selected. A closed-cell foam body is suitably used as the frame material, since it prevents a flow of sound, water, gas, and the like and has a high structural hardness, compared to an open-cell foam body. In a case where the porous sound absorbing body has sufficient supportability, only the porous sound absorbing body may be used as the frame material. As described above, by using, as the frame material, the structure containing air inside, the weight of the silencing device 30 can be reduced and heat insulating properties can be imparted to the silencing device 30.

In a case where the resonance silencer 34 is a film type resonator, a metal material, a resin material, a reinforced plastic material, a carbon fiber, and rubbers can be used as the film material.

Figure 6:
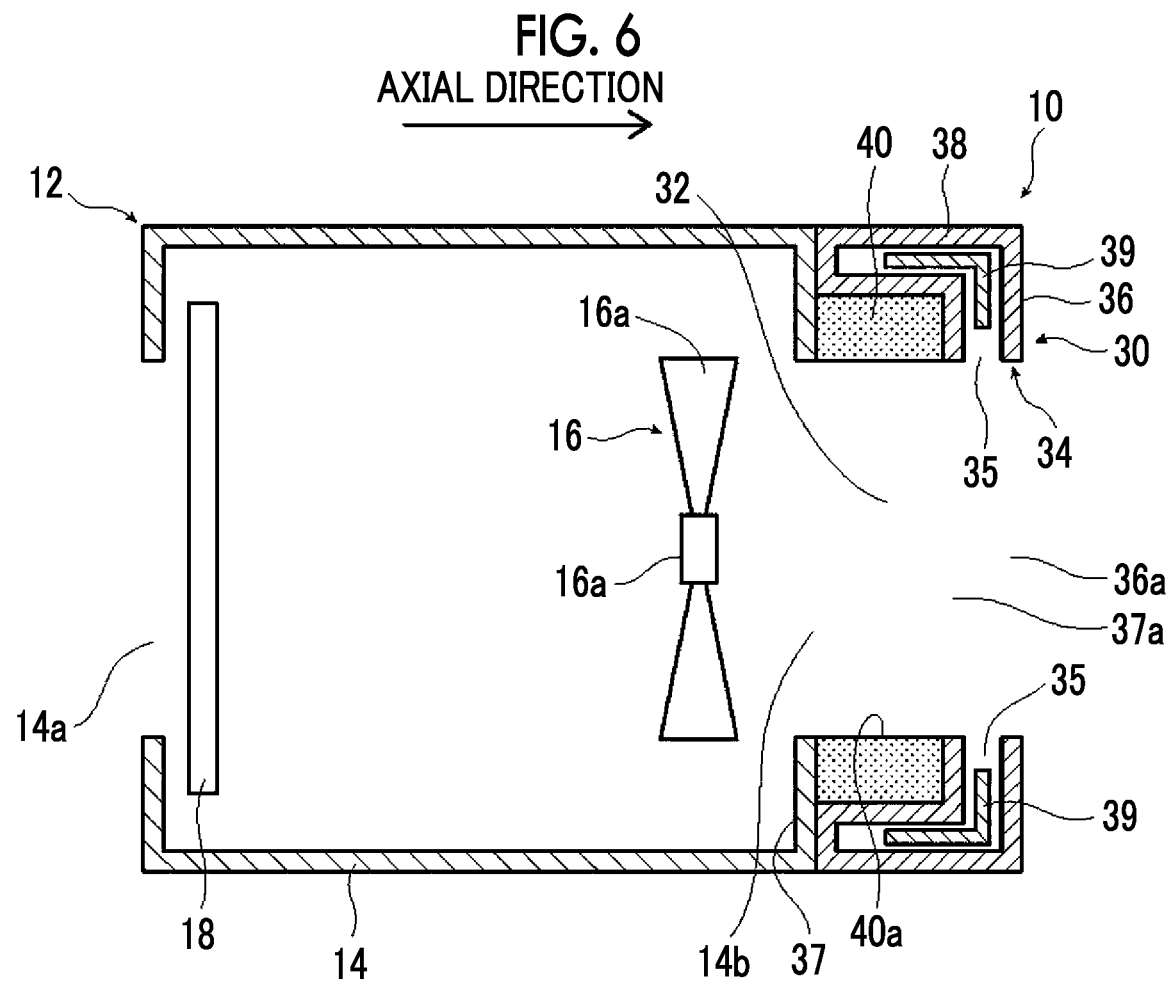
FIG. 6 is a cross-sectional view of an air supply system according to a second modification example.

As shown in FIG. 6, an insert 39 having sound absorbing properties may be disposed inside the resonance silencer 34. As a result, it is possible to silence sound having a frequency other than the above-mentioned first silencing and second silencing in a wide band.

The insert 39 may be any one of a foam material, a nonwoven fabric, or a porous material, or may be a combination of two or more of these. As the material for forming the insert 39, a known material can be used. Examples thereof include foam materials such as urethane foam, flexible urethane foam, wood, a ceramic particle-sintered material, or phenol foam, and a material containing minute air, fibers and nonwoven materials such as glass wool, rock wool, microfiber such as THINSULATE manufactured by 3M Company, a floor mat, a carpet, a melt-blown nonwoven fabric, a metal nonwoven fabric, a polyester nonwoven fabric, metal wool, felts, an insulation board, and glass nonwoven fabric, a wood wool cement board, a nanofiber material such as a silica nanofiber, and a gypsum board.

As shown in FIG. 3, the silencing device 30 further has the silencing body 40 different from the resonance silencer 34. The silencing body 40 is a component that silences sound by absorbing sound. Specifically, the silencing body 40 may be any one of a foam material, a nonwoven fabric, or a porous material, or may be a combination of two or more of these, as in the case of the insert 39. As the specific material of the silencing body 40, the same material as the material of the insert 39 mentioned above can be used.

As shown in FIG. 3, the silencing body 40 is disposed outward in the radial direction of the ventilation portion 32, and is disposed at a position where the flow of air in the ventilation portion 32 is not blocked. Specifically, in a region between the rotor 16a (that is, the sound source) of the axial fan 16 and the end portion of the resonance silencer 34 in the axial direction, the silencing body 40 is disposed to surround the ventilation portion 32. The silencing body 40 disposed in the above region is located closer to the rotor 16a than the opening portion 35 including the end portion of the resonance silencer 34.

For the purpose of suppressing the increase in size of the silencing device 30 by the installation of the silencing body 40, the silencing body 40 may be disposed in a recess portion formed by the recessed peripheral portion of the ventilation hole 37a in the second end wall 37 constituting the resonance silencer 34. As a result, it is possible to compactly install the silencing body 40.

Figure 7:
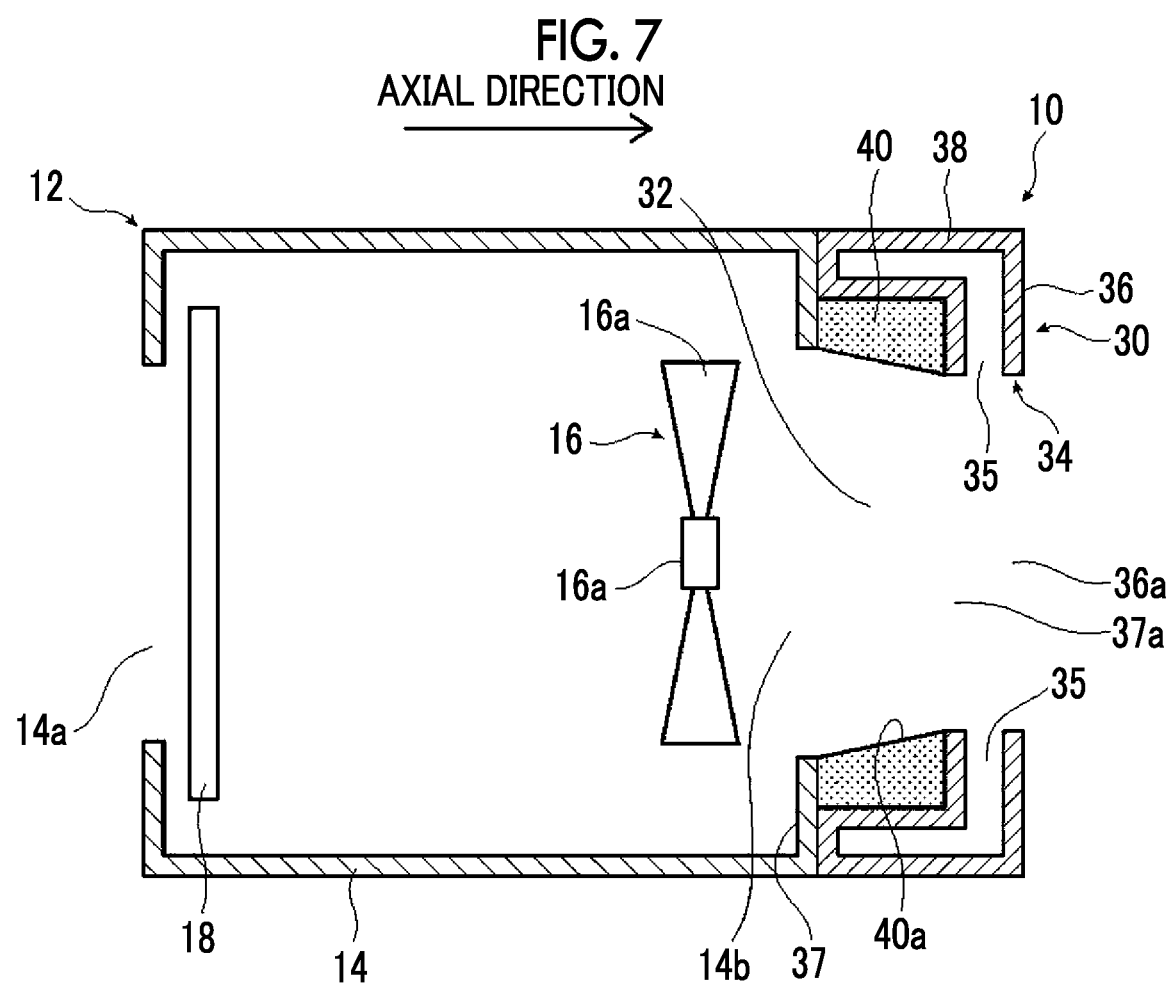
FIG. 7 is a cross-sectional view of an air supply system according to a third modification example.

The silencing body 40 formed in an annular shape may be used to dispose the silencing body 40 continuous in the circumferential direction of the ventilation portion 32. In this case, a through-hole 40a at a center portion of the silencing body 40 may be a straight hole as shown in FIG. 3, or may be a tapered hole as shown in FIG. 7.

The silencing body 40 may be provided discontinuously at a constant pitch in the circumferential direction of the ventilation portion 32.

[Regarding Silencing Mechanism of Silencing Device According to Embodiment of Present Invention]

For the purpose of clarifying a silencing mechanism of the silencing device 30 according to the embodiment of the present invention, a structural model described below was created, and a silencing volume of the resonance silencer 34 was obtained by simulation. The structural model corresponds to an actual device of Example 1 described below.

<Regarding Structural Model>

Figure 8:
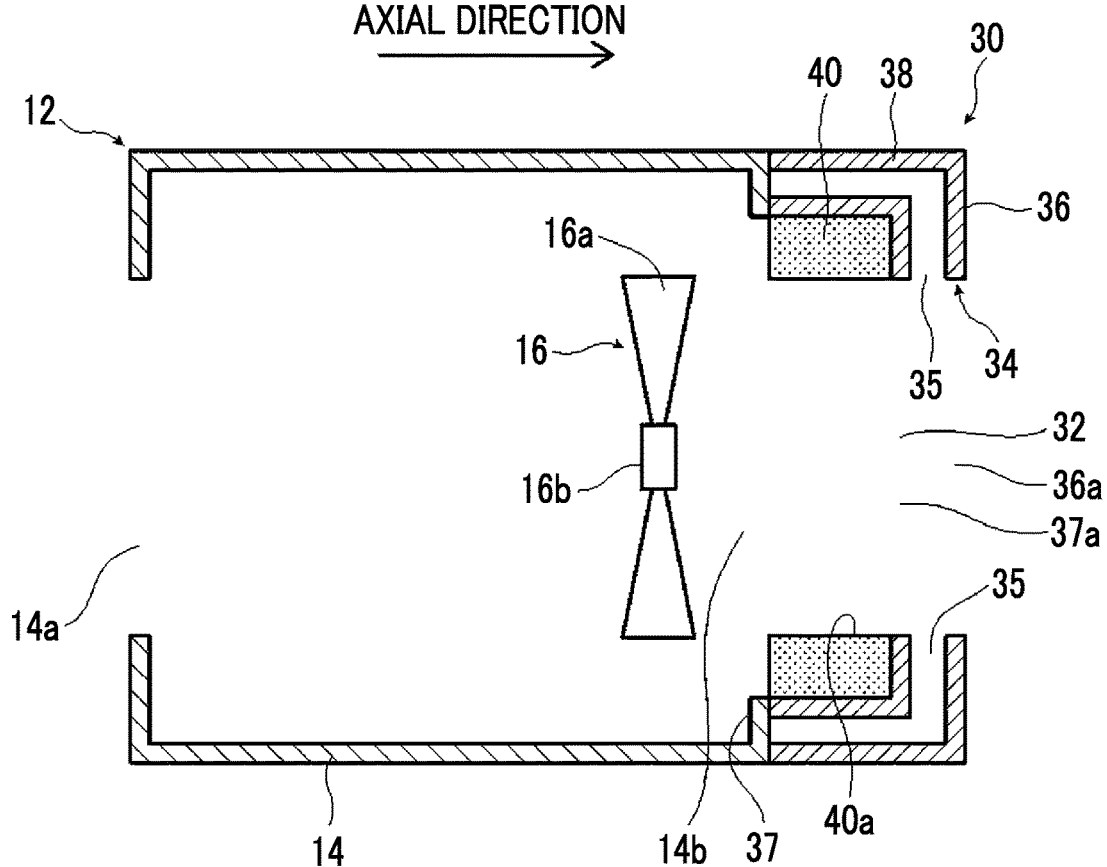
FIG. 8 is an explanatory diagram of a structural model.

The structural model is a model of the air supply system 10 shown in FIG. 8. As the air supply system main body 12 of the air supply system 10, an air conditioner "MULTI-CUBE" manufactured by Daikin Industries, Ltd. was assumed. This device is a personal air conditioner having a heat exchanger inside, and air is blown using the axial fan 16 having a rotor diameter of 310 mm.

The size of the housing is 550 mm in width×360 mm in height×400 mm in depth, and an opening portion having a diameter of 350 mm (that is, the exhaust port 14b) is provided on the discharge side. The diameter of the opening portion can be converted to 250 mm by using an optional product.

In the structural model, the silencing device 30 having the resonance silencer 34 having an L-shaped air column resonance structure was attached to the discharge side of the housing of the air conditioner. Specifically, as shown in FIG. 8, a cylindrical inner tube having a length of 70 mm was attached to an opening portion of the housing 14, and an annular plate having an opening having a diameter of 250 mm and having an outer diameter of 350 mm was attached to an end portion thereof. The circular tubular plate is an acrylic plate having a thickness of 5 mm. An inner space of the inner tube forms the ventilation portion 32, and wind flows from the above air conditioner. The air blowing strength of the above air conditioner was set to a high mode.

As shown in FIG. 8, a square tubular outer tube was attached to an outer edge of the housing 14, and a rectangular plate having an opening having a diameter of 250 mm and having a width of 550 mm×a height of 360 mm was attached to an end portion (end portion opposite to the housing 14) thereof. As a result, the resonance silencer 34 having an L-shaped air column resonance structure was disposed at a discharge side tip of the housing 14 in a state where the exhaust port 14b and the ventilation portion 32 were aligned.

Dimensional values (specifically, values indicated by symbols d1, d2, h, t1, t2, and w in FIG. 4) of each part of the resonance silencer 34 are as follows.

d1=250 mm, d2=350 mm, and h=360 mm
t1=60 mm, t2=70 mm, and w=550 mm

Furthermore, as shown in FIG. 8, an annular sound absorbing urethane having an outer diameter of 350 mm and having an opening of 250 mm in a center portion was disposed inside the inner tube. This sound absorbing urethane forms the silencing body 40, has a thickness of 70 mm, and has a flow resistance of 10^4 Rayls. As shown in FIG. 8, the sound absorbing urethane was disposed to fit in a corner portion bent into an L-shape in the air column resonance type resonance silencer 34.

<Regarding Simulation Results>

Figure 9:
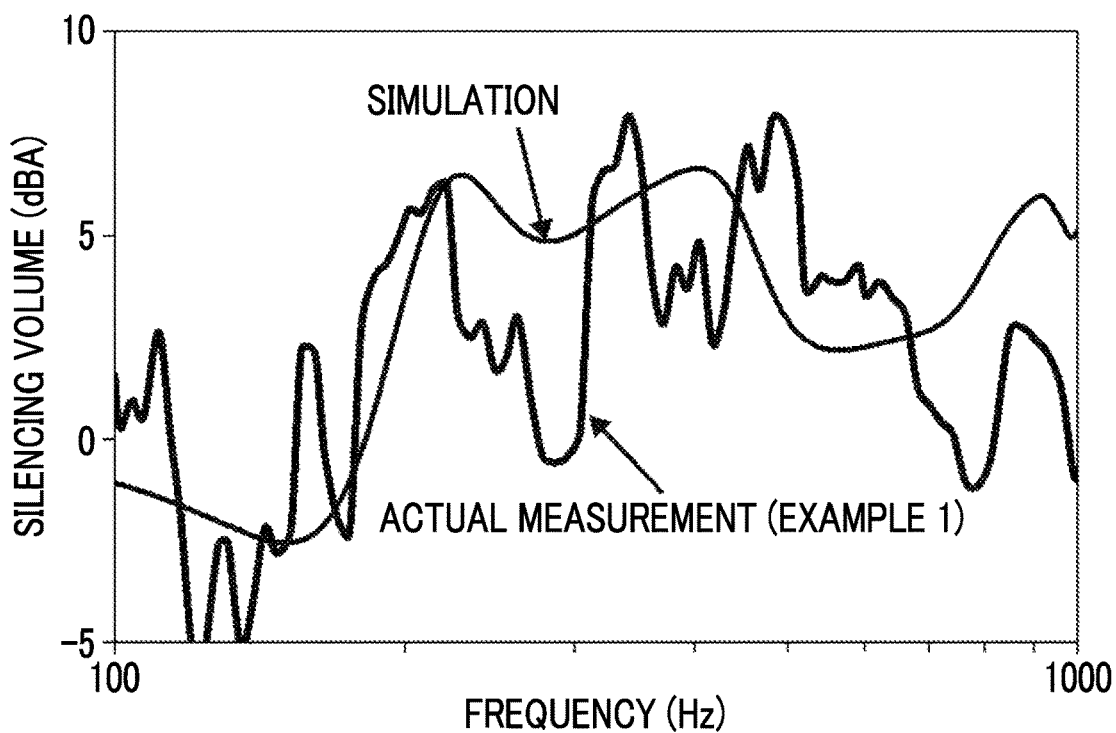
FIG. 9 is a diagram showing simulation results and actual measurement results of a silencing volume in a case where a structural model is used (Example 1).

Results of the simulation using the above structural model are shown in FIG. 9. As shown in FIG. 9, a simulated silencing volume corresponds satisfactorily to an actual measurement value (in detail, actual measurement results of Example 1 described below). From the simulation results, it was clarified that a wide-band silencing effect with a plurality of peaks in a low frequency region can be obtained.

Figure 10:
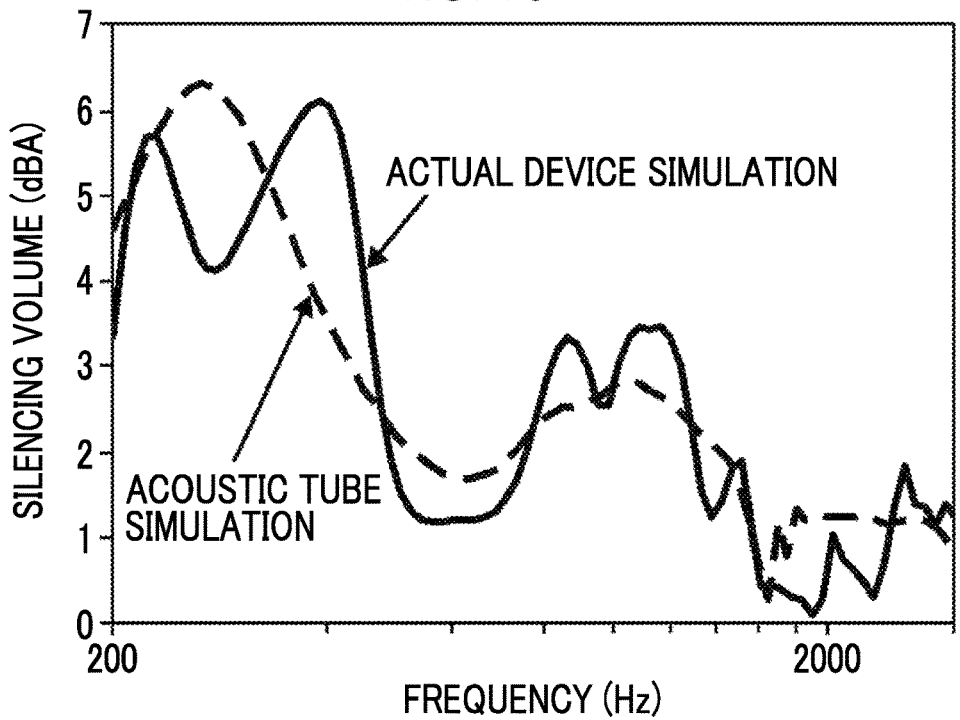
FIG. 10 is a diagram showing simulation results of a silencing volume in each of an acoustic tube model and an actual device model.

Here, for the purpose of isolating the effect of the sound source (hereinafter, also referred to as an internal sound source) in the housing 14, a simulation model (hereinafter, also referred to as an acoustic tube model) was constructed to calculate the silencing volume in a system in which the resonance silencer 34 is installed in an acoustic tube having a diameter of φ250 mm. That is, the incident wave was regarded as a plane wave from far, and the transmittance and reflectance of the sound were obtained, and the absorption and transmission loss were calculated. In addition, the silencing effect in a case where the resonance silencer 34 is installed in an actual device model having an internal sound source (model excluding the silencing body 40 from the above structural model) was calculated separately. A calculation result of each silencing volume is shown in FIG. 10.

A silencing effect at a single peak frequency was exhibited in the acoustic tube model. This is a common tendency in ordinary resonators. On the other hand, in the actual device model, silencing peaks were shown at a plurality of frequencies different from each other, specifically, around 230 Hz and around 400 Hz.

From the above results, it was found that the widening of the silencing band in a low frequency region, which is a feature of the present invention, is realized by attaching the resonance silencer 34 to the internal sound source system. In order to investigate this mechanism, spatial distribution of acoustic characteristics (sound pressure and local velocity) at two silencing peaks was calculated.

Figure 11:
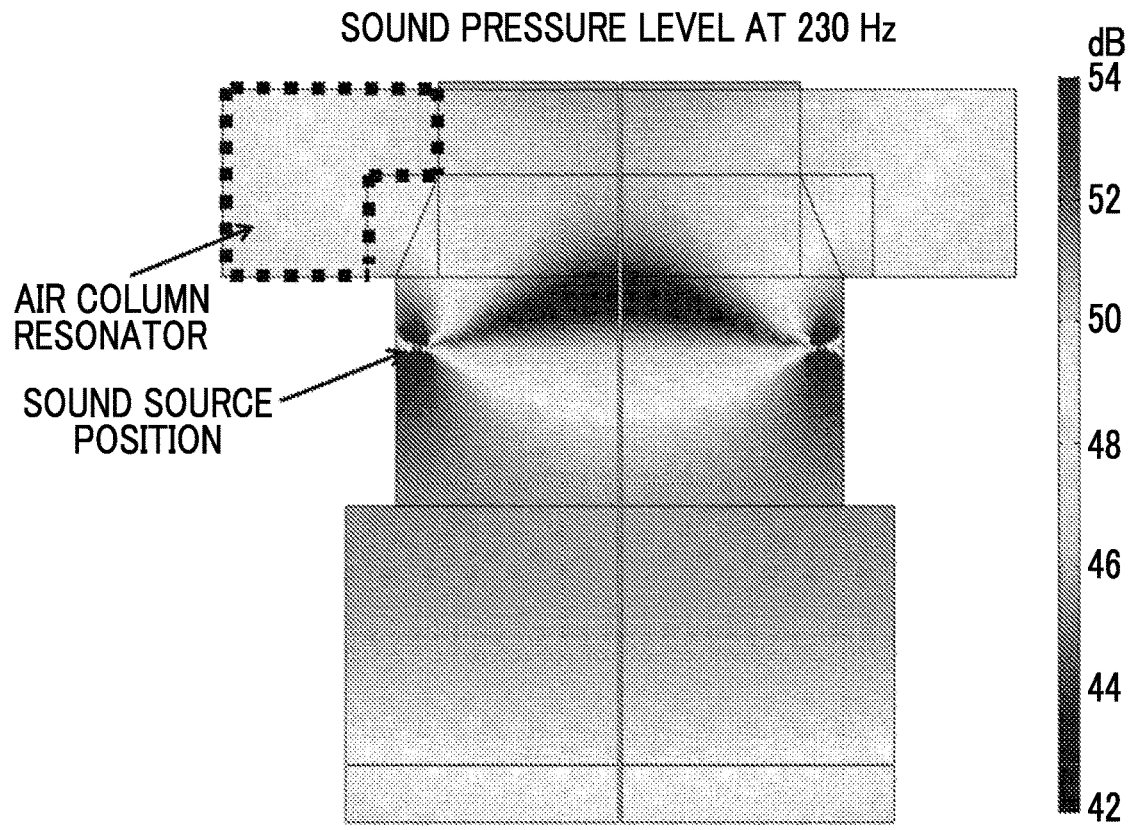
FIG. 11 is a diagram showing simulation results for a spatial distribution of a sound pressure level at 230 Hz.

First, spatial distribution of a sound pressure level at 230 Hz is shown in FIG. 11. In FIG. 11, the upper side is the discharge side and the lower side is the intake side. As can be seen from FIG. 11, the sound pressure increased inside the L-shaped resonance silencer 34, and decreased near the opening on the discharge side of the silencing device 30. From this, it is supposed that a resonance phenomenon occurs in the resonance silencer 34, and a sound component radiated outside the air supply system 10 is canceled by the radiated sound from the resonance silencer 34. Therefore, it was found that the resonance characteristic of the resonance silencer 34 is dominant in the silencing peak at 230 Hz, which is on the lower frequency side.

Figure 12:
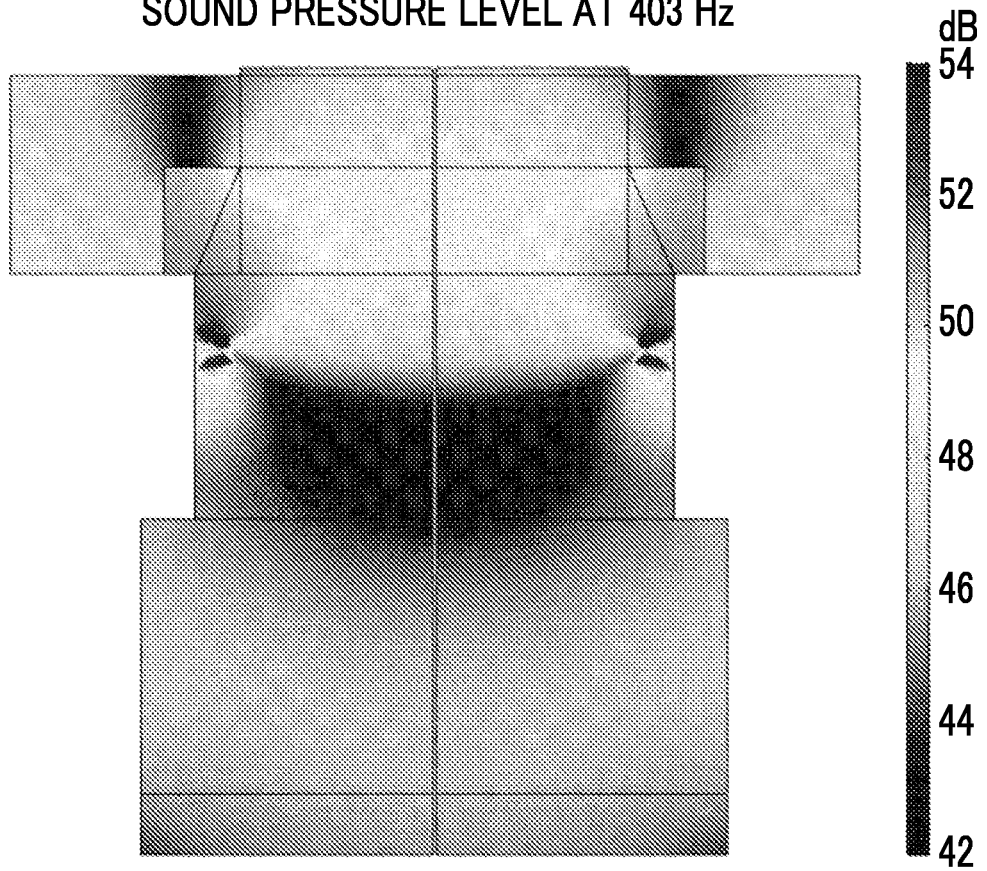
FIG. 12 is a diagram showing simulation results for a spatial distribution of a sound pressure level at 403 Hz.
Figure 13:
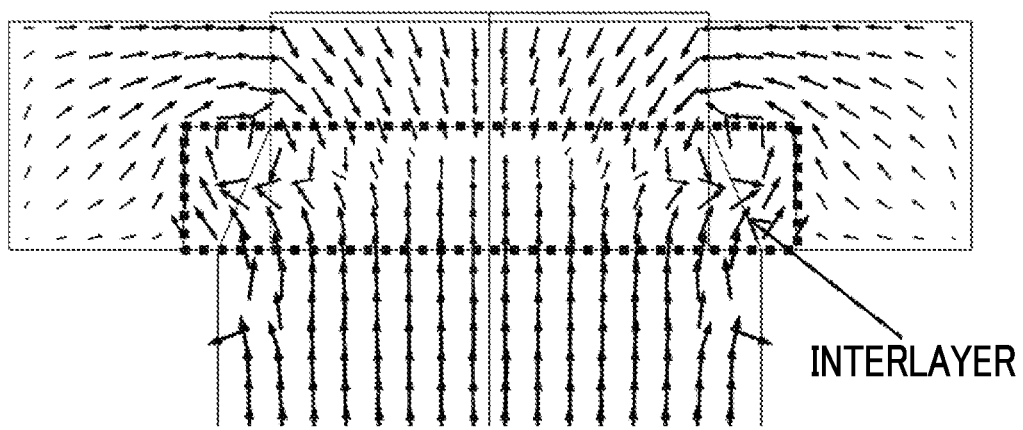
FIG. 13 is a diagram showing a local velocity distribution corresponding to the spatial distribution of the sound pressure level at 403 Hz.

Next, spatial distribution of a sound pressure level at 403 Hz is shown in FIG. 12, and corresponding local velocity distribution is shown in FIG. 13. As can be seen from FIG. 12, inside the L-shaped resonance silencer 34, the sound pressure was not relatively large, and it was not a simple resonance phenomenon. According to FIG. 13, it was found that, in a vertical direction (that is, the axial direction), a phase of the local velocity from the internal sound source and a phase of the local velocity of the reflected sound radiated from the resonance silencer 34 are reversed, so that cancellation interference occurs. In this case, it is supposed that the sound is retained and confined in a region between the position of the internal sound source and the position of the end portion of the resonance silencer 34 (hereinafter, also referred to as an "interlayer" for convenience), so that it is difficult to radiate the sound to the outside. This is consistent with the fact that the sound pressure of the interlayer is increased in FIG. 12.

As described above, it was found that the characteristics of the silencing in the low frequency region according to the present invention are widened in band by the first silencing at around 230 Hz where the resonance phenomenon of the resonance silencer 34 is dominant, and the second silencing at around 403 Hz where the near-field interference (sound confinement) in the interlayer is dominant.

Here, in the second silencing, a distance between the position of the internal sound source and the end portion of the resonance silencer 34, that is, a thickness of the interlayer is important, so that the frequency of silencing and the silencing volume were calculated for each of the first silencing and the second silencing using the thickness of the interlayer as a parameter. The L-shaped resonance silencer 34 is located on the exhaust port 14*b* side of the housing 14 as in the above structural model, to change the thickness of the interlayer.

Figure 14:
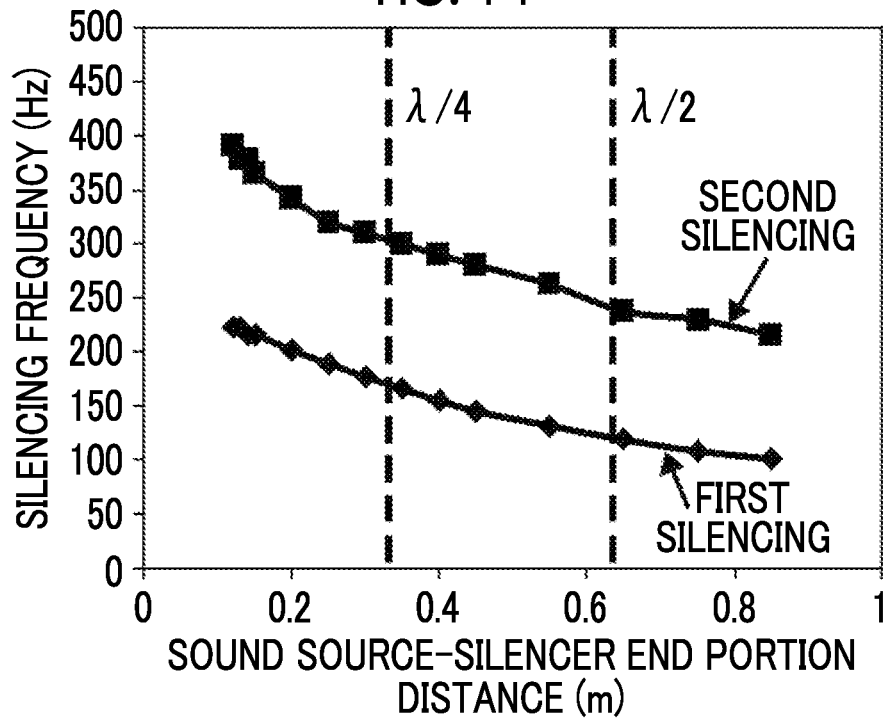
FIG. 14 is a diagram showing a silencing frequency calculated by changing a distance between a position of an internal sound source and an end portion of a resonance silencer for each of first silencing and second silencing by a silencing device of an embodiment of the present invention.
Figure 15:
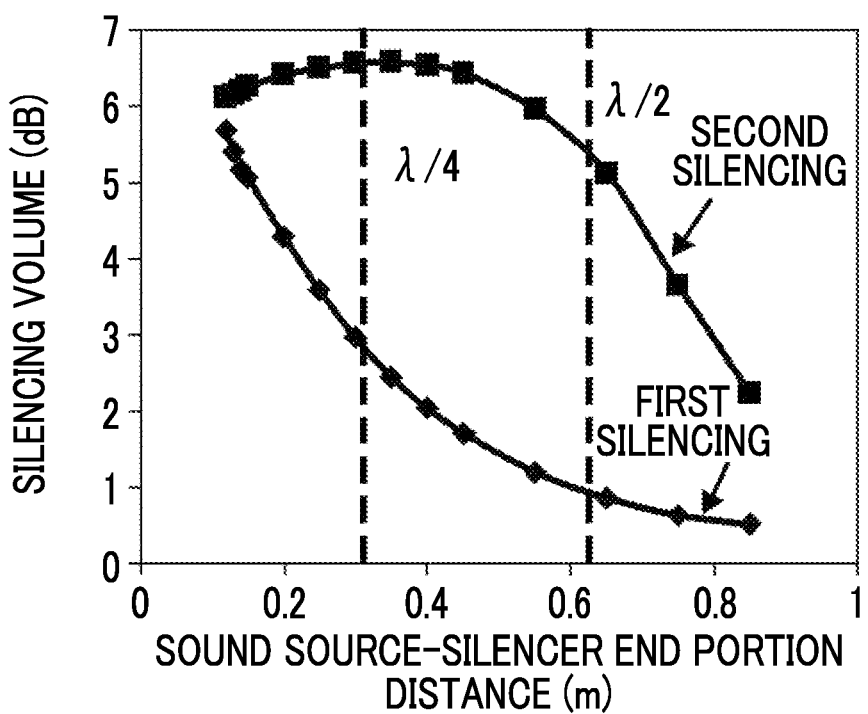
FIG. 15 is a diagram showing a silencing volume calculated by changing a distance between a position of an internal sound source and an end portion of a resonance silencer for each of first silencing and second silencing by a silencer of the present invention.

For the above calculation results, the silencing frequency is shown in FIG. 14 and the silencing volume is shown in FIG. 15. λ in each figure represents a resonance wavelength of the resonance silencer 34 alone measured by the acoustic tube.

As the thickness of the interlayer is increased, the silencing volume in the first silencing is gradually decreased. That is, for the resonance located on the low frequency side, it was found that the silencing volume is greater in a case where the end portion of the resonance silencer 34 is disposed near the internal sound source. Further, in a case where the thickness of the interlayer is larger than about λ/4, the silencing volume in the second silencing is also gradually decreased. In a case where the thickness of the interlayer is about λ/2, the silencing volume in the first silencing is less than 1 dB, so that the wide-band silencing effect which is an effect of the present invention can hardly be obtained. In addition, the thicker the interlayer, the larger the silencing device.

From the above, it is considered that the thickness of the interlayer is less than λ/2, which is a necessary condition for obtaining the wide-band sound silencing effect of the present invention. In addition, considering the magnitude of the silencing volume in the second silencing, it is more desirable that the thickness of the interlayer is less than λ/4.

EXAMPLES

Hereinafter, the present invention will be specifically described with reference to Examples 1 to 3 described below. The materials, the amounts of materials used, the proportions, the treatment details, the treatment procedure, and the like shown in Examples below may be appropriately modified as long as the modifications do not depart from the spirit of the present invention. Therefore, the scope of the present invention should not be restrictively interpreted by the following Examples.

Example 1

In Example 1, the same structure as the above-mentioned structural model shown in FIG. 8 was adopted as an actual device. In Experiment 1, the distance between the position of the internal sound source and the position of the end portion of the resonance silencer 34, that is, the thickness of the interlayer was set to 120 mm.

Reference Example 1

Figure 16:
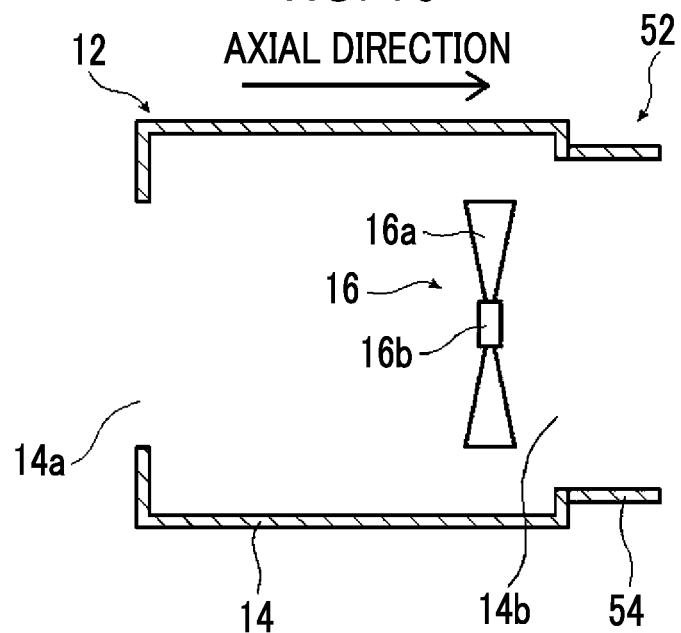
FIG. 16 is a diagram showing a model of an air supply device used in Reference Example 1.

In Reference Example 1, an air supply device 52 shown in FIG. 16 was used. The air supply device 52 includes an air conditioner (MULTICUBE manufactured by Daikin Industries, Ltd.) constituting the air supply system main body 12 in Example 1, and is configured by simply attaching a tube body 54 having a length of 70 mm to the exhaust port 14*b* (diameter of 350 mm) of the housing 14. That is, it was decided that the silencing device of Example 1 is not provided in Reference Example 1. Other than that, the conditions were the same as in Example 1.

Of the air supply device 52 shown in FIG. 16, the same components as those in Example 1 are designated by the same reference numerals as those in FIG. 8.

Comparative Example 1

Figure 17:
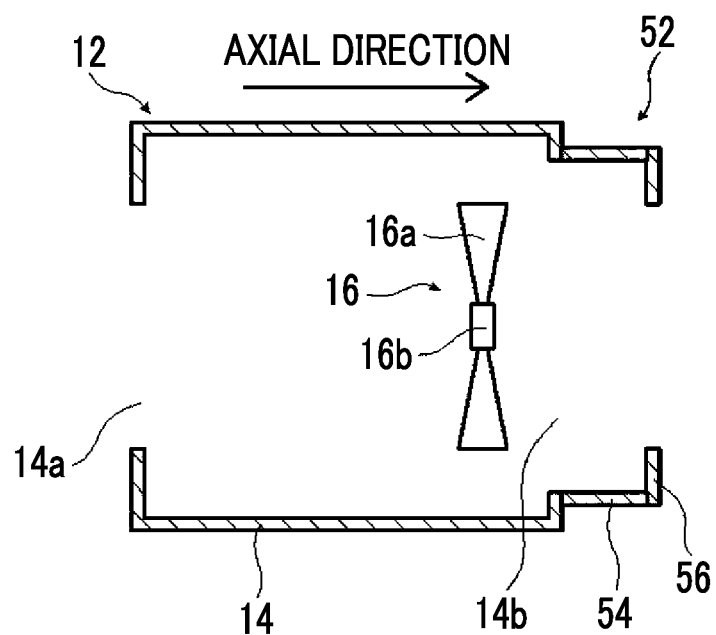
FIG. 17 is a diagram showing a model of an air supply device used in Comparative Example 1.

In Comparative Example 1, as shown in FIG. 17, an annular plate 56 having an opening having a diameter of 250 mm and having an outer diameter of 350 mm was attached to an end portion of the tube body 54 in Reference Example 1. That is, the opening on the discharge side was narrowed to 250 mm, and other conditions were the same as those in Reference Example 1.

Of the device shown in FIG. 17, the same components as those in Reference Example 1 are designated by the same reference numerals as those in FIG. 16.

Comparative Example 2

Figure 18:
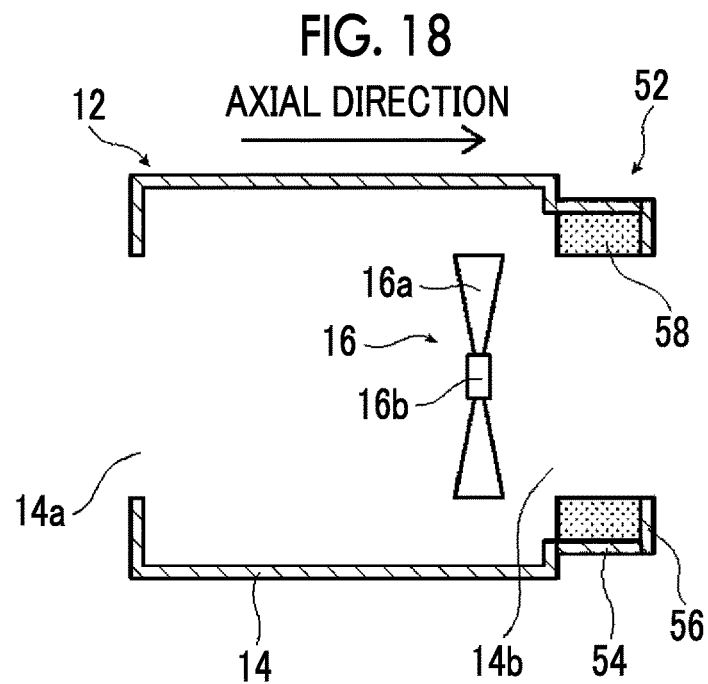
FIG. 18 is a diagram showing a model of an air supply device used in Comparative Example 2.

In Comparative Example 2, as shown in FIG. 18, an annular sound absorbing urethane 58 having an outer diameter of 350 mm and having an opening of φ250 mm in a center portion was disposed inside the tube body 54 in the device of Comparative Example 1. That is, inside the tube body 54 of Comparative Example 1, a region outside the opening on the discharge side was filled with the sound absorbing urethane 58. The sound absorbing urethane 58 has a thickness of 70 mm and has a flow resistance of $10^4$ Rayls.

(Measurement of Sound)

In each of Example 1, Reference Example 1, and Comparative Examples 1 and 2, the air conditioner was operated to rotate the axial fan 16 for acoustic measurement. In the acoustic measurement, microphones were disposed at positions shifted by 1 m from a center portion of the opening on the discharge side in a depth direction and a height direction, respectively, and the sound pressure was measured at a position where wind was not directly received.

Figure 19:
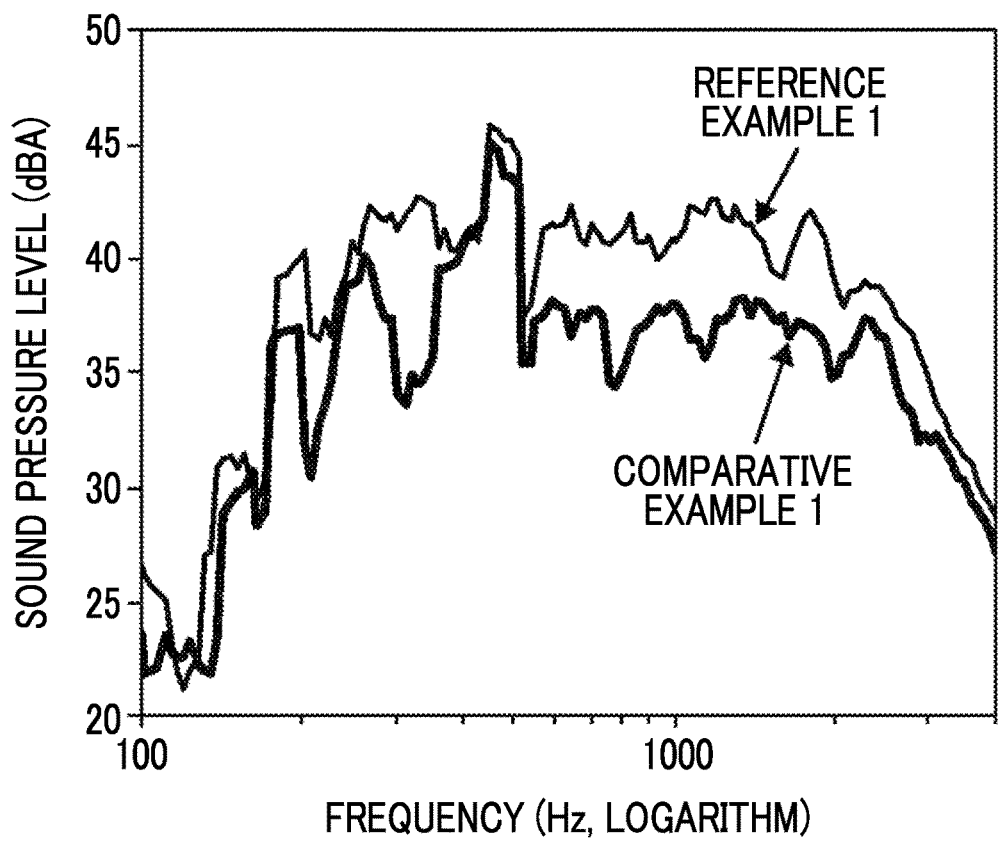
FIG. 19 is a diagram showing measurement results of sound pressure in each of Reference Example 1 and Comparative Example 1.

Measurement results of Reference Example 1 and Comparative Example 1 are shown in FIG. 19. Although the noise on the high frequency side was reduced by narrowing an opening diameter on the discharge side, the noise on the low frequency side remained, including narrow-band noise (noise with large sound pressure) around 450 Hz.

Figure 20:
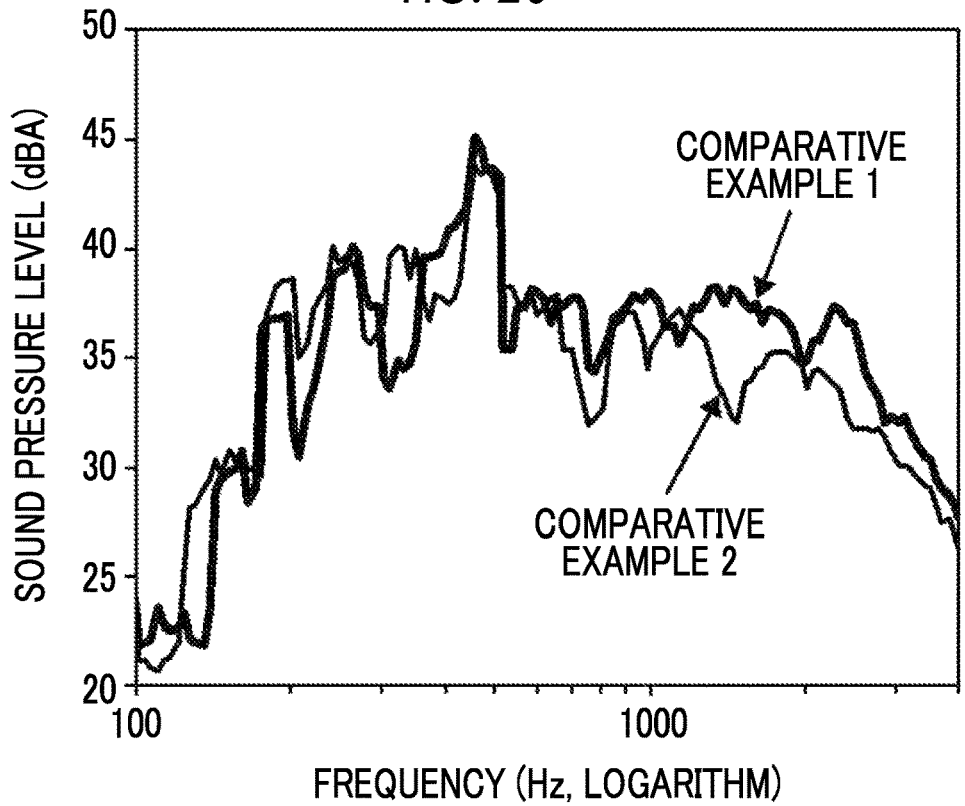
FIG. 20 is a diagram showing measurement results of sound pressure in each of Comparative Example 1 and Comparative Example 2.

Measurement results of Comparative Example 1 and Comparative Example 2 are shown in FIG. 20. In Comparative Example 2, compared with Comparative Example 1, the noise on the high frequency side of 1 kHz or higher was reduced by the effect of the sound absorbing urethane 58, but the noise on the low frequency side was not reduced compared with Comparative Example 1, and tended to increase depending on the frequency.

Figure 21:
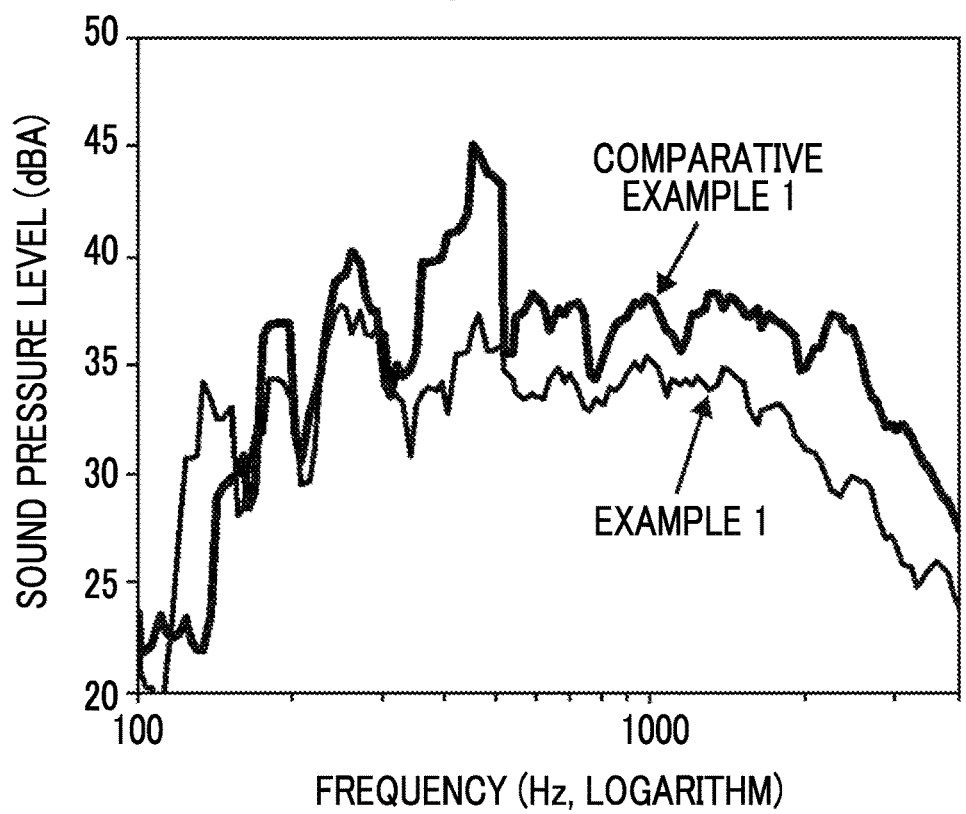
FIG. 21 is a diagram showing measurement results of sound pressure in each of Example 1 and Comparative Example 1.

Measurement results of Example 1 and Comparative Example 1 are shown in FIG. 21. In Example 1, compared with Comparative Example 1 in which the opening diameter on the discharge side is the same, the noise in a region of 600 Hz or higher was reduced, and the noise in a band around 450 Hz, which was not reduced in other examples (Reference Example 1, Comparative Example 1, and Comparative Example 2), was also silenced.

For each of Example 1, Reference Example 1, and Comparative Examples 1 and 2, the noise volume in the whole frequency band was evaluated by an A-weighted sound pressure level, and a difference of the noise volume from Reference Example 1 was obtained and shown in Table 1. The A-weighted sound pressure level is a noise level (unit: dBA) in a case where the sound volume was integrated by performing A-weighted correction, which is correction in consideration of the sensitivity of the human ear, for the whole frequency audible range.

TABLE 1

|  | Reference Example 1 | Comparative Example 1 | Comparative Example 2 | Example 1 |
| --- | --- | --- | --- | --- |
| Noise volume in whole frequency band (dBA) | 60.1 | 58.7 | 57.8 | 54.4 |
| Difference of noise volume from Reference Example 1 (dBA) | — | 1.4 | 2.3 | 5.7 |

As shown in Table 1, by providing the resonance silencer 34, the noise volume was reduced by 5.7 dBA from the original state (Reference Example 1), and was reduced by 4.3 dBA from Comparative Example 1 in which the opening diameter on the discharge side is the same. In general, it is said that in a case where there is a difference of 3 dBA, the difference can be sufficiently recognized by the auditory sense of an ordinary person. Therefore, in Example 1, a high silencing effect was exhibited while maintaining the opening diameter on the discharge side. In addition, it was found that even though only an ordinary sound absorbing material (specifically, the sound absorbing urethane 58) is used as in Comparative Example 2, a difference of the noise volume from Comparative Example 1 was 0.9 dBA, whereas in Example 1, a large sound silencing effect was obtained by the effect of the resonance silencer 34.

In a case where the sound was recorded and compared at the disposing position of the measurement microphone during the sound pressure measurement, a difference between Example 1 and Comparative Examples 1 and 2 was sufficiently recognized.

(Comparison Between Reference Calculation and Experimental Results)

A reference calculation corresponding to the above-mentioned sound pressure measurement experiment was performed. Specifically, for each of Reference Example 1, Comparative Examples 1 and 2, and Example 1, a housing accommodating an axial fan therein was modeled using calculation software "COSMOL Multiphysics" of a finite element method. The axial fan was regarded as an internal sound source, a dipole sound source was disposed at a blade tip of a rotor of the axial fan, and sound pressure distribution was calculated. In addition, in order to verify the calculation results, a measurement experiment of the sound pressure distribution was performed with semi-anechoic chamber sound.

Figure 22:
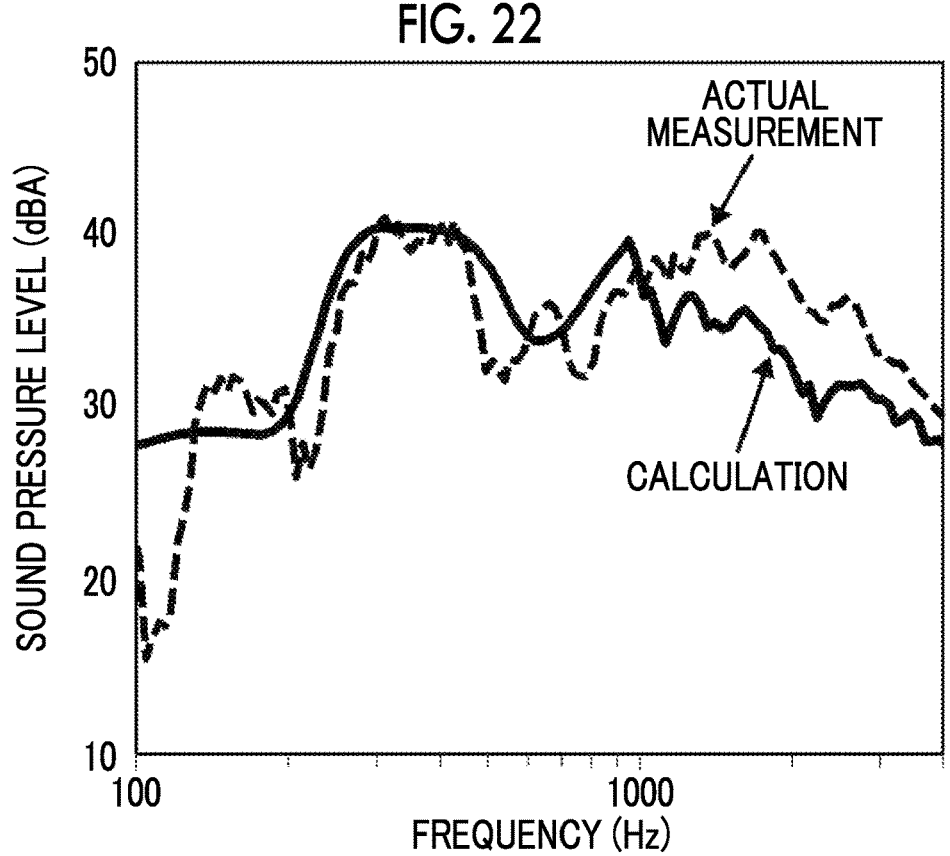
FIG. 22 is a diagram showing a reference calculation result and an actual measurement result for the sound pressure in Reference Example 1.

FIG. 22 shows the results of the reference calculation and the experiment with respect to the original state, that is, the state corresponding to Reference Example 1 in which the opening diameter on the discharge side is φ350 mm. As can be seen from the comparison of both results, it was found that the results of the reference calculation satisfactorily reproduce the experimental results.

Figure 23:
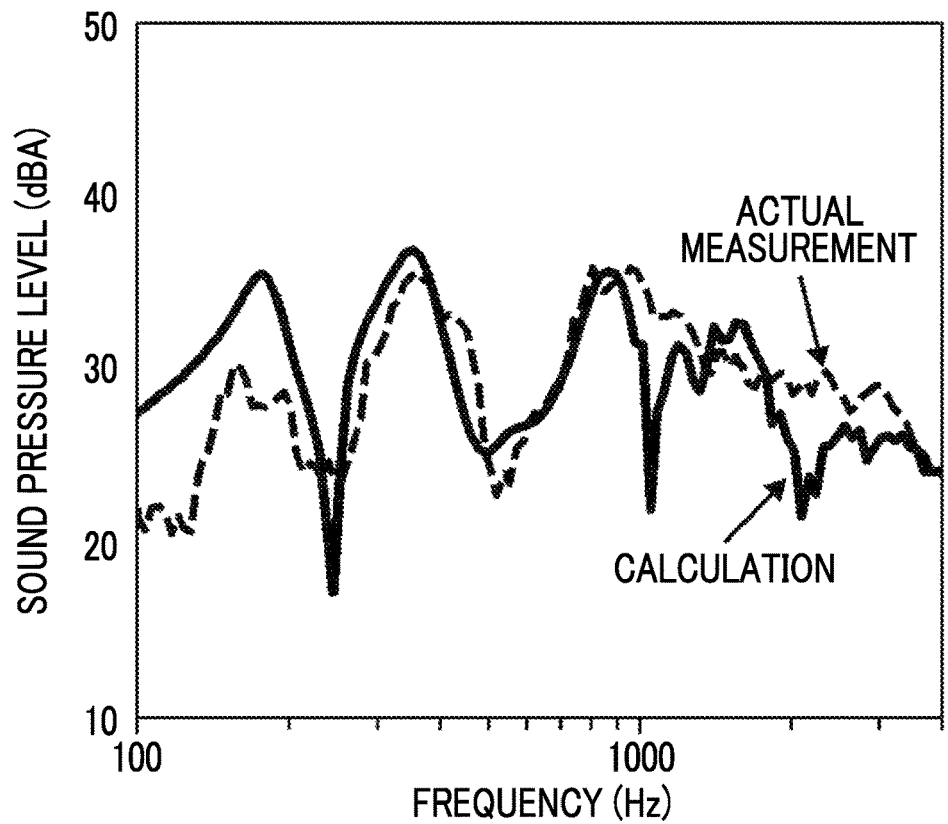
FIG. 23 is a diagram showing a reference calculation result and an actual measurement result for the sound pressure in Example 1.

Similarly, in a case where the results of the reference calculation and the experiment were compared with respect to the state in which the resonance silencer was disposed, that is, the state corresponding to Example 1, it was found that the results of the reference calculation satisfactorily reproduce the experimental results, as shown in FIG. 23.

As described above, as a result of comparative verification of the reference calculation with the experiment using a semi-anechoic chamber, it was shown that the reference calculation can reproduce the experiment (actual measurement) with sufficient accuracy.

In addition, in a case where equipment configurations of each of Reference Example 1, Comparative Examples 1 and 2, and Example 1 were modeled and calculated, the approximate shape of the spectrum and the silencing volume obtained as the experimental results in the ordinary laboratory were satisfactorily reproduced. The calculation results of the silencing volume are shown in Table 2.

TABLE 2

| | Reference Example 1 | Comparative Example 1 | Comparative Example 2 | Example 1 |
|---|---|---|---|---|
| Noise volume in whole frequency band of simulation (dBA) | 60.4 | 58.9 | 57.8 | 54.6 |

In Example 1, a plurality of silencing peaks are provided in a low frequency region, thereby exhibiting wide-band silencing. FIG. 9 shows the actual measurement value and the simulation result for the silencing volume in a case where the resonance silencer was installed, that is, in Example 1. In FIG. 9, the noise level at which the resonance silencer was installed is represented by a value obtained by subtracting from the noise level by closing the entrance of the resonance silencer with a wall. As shown in FIG. 9, in a case where the resonance silencer was installed, the silencing peaks appeared at around 200 Hz and at around 350 to 500 Hz.

In a case where a model corresponding to Example 1 (that is, the structural model shown in FIG. 8) was created and the silencing volume of the resonance silencer was obtained by simulation, it was found that the simulated silencing volume satisfactorily corresponds to the experimental value (see FIG. 10). From the simulation, it was confirmed that in the structural model corresponding to Example 1, a wide-band silencing effect with a plurality of peaks in a low frequency region can be obtained.

Example 2

Figure 24:
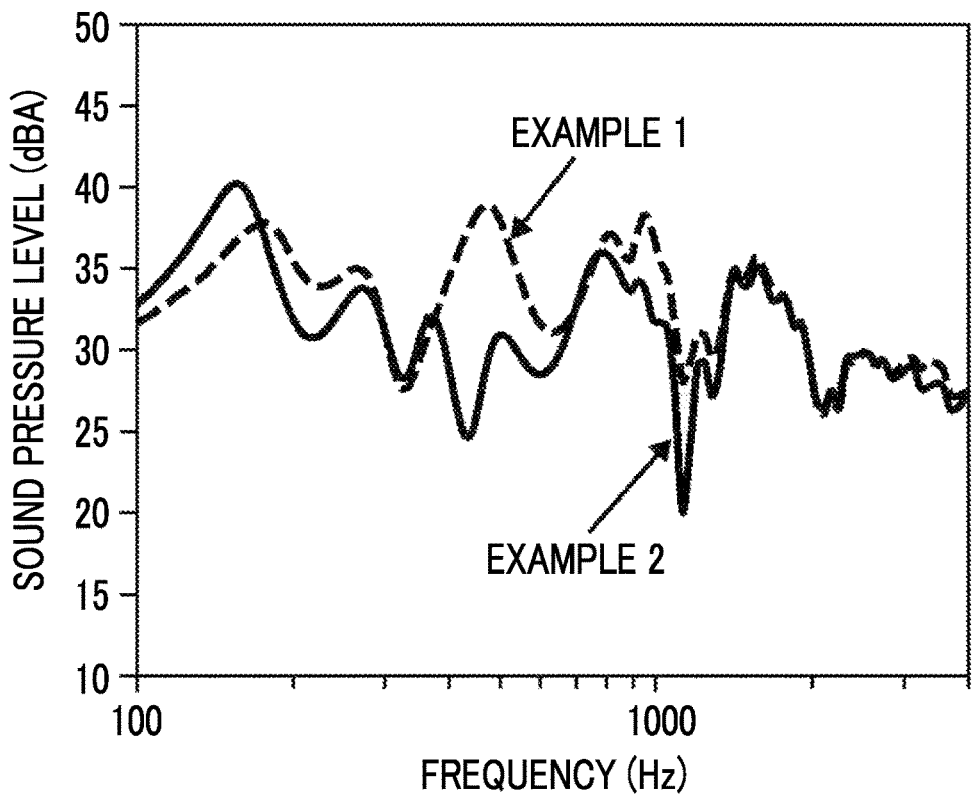
FIG. 24 is a diagram showing simulation results of sound pressure in each of Example 1 and Example 2.

In Example 1, as shown in FIG. 24, a region of large noise remained around 400 Hz. In Example 2, further silencing measures were implemented by attaching a second resonance silencer whose resonance frequency was matched to the frequency band.

Specifically, the second resonance silencer was additionally attached to the discharge side of Example 1 to simulate the silencing effect. The second resonance silencer is a linear air column resonator that extends straight, unlike the L-shaped air column resonance silencer. In detail, it has a hollow structure surrounded by plates of 550 mm×360 mm×60 mm, and a through-hole having a diameter of φ250 mm was drilled in the center portion of the plates on both sides.

The simulation result of the sound pressure level in Example 2 is shown in FIG. 24. With the addition of the second resonance silencer, it was possible to achieve silencing around 400 Hz. In this way, by providing the resonance silencer in multiple stages, it is possible to obtain a wider-band silencing effect.

Example 3

In Example 3, a tube body having a length of 60 mm and an inner diameter of 250 mm was attached to the discharge side opening of Example 1. In the original structure (Comparative Example 1), since only a plate having a thickness of 5 mm was provided in the discharge side opening, sound was scattered inside the housing, and high-angle sound was also radiated to the outside (outside the housing). With respect to this, by attaching a tube body to the discharge side opening, an effect of cutting the high-angle sound is expected.

Figure 25:
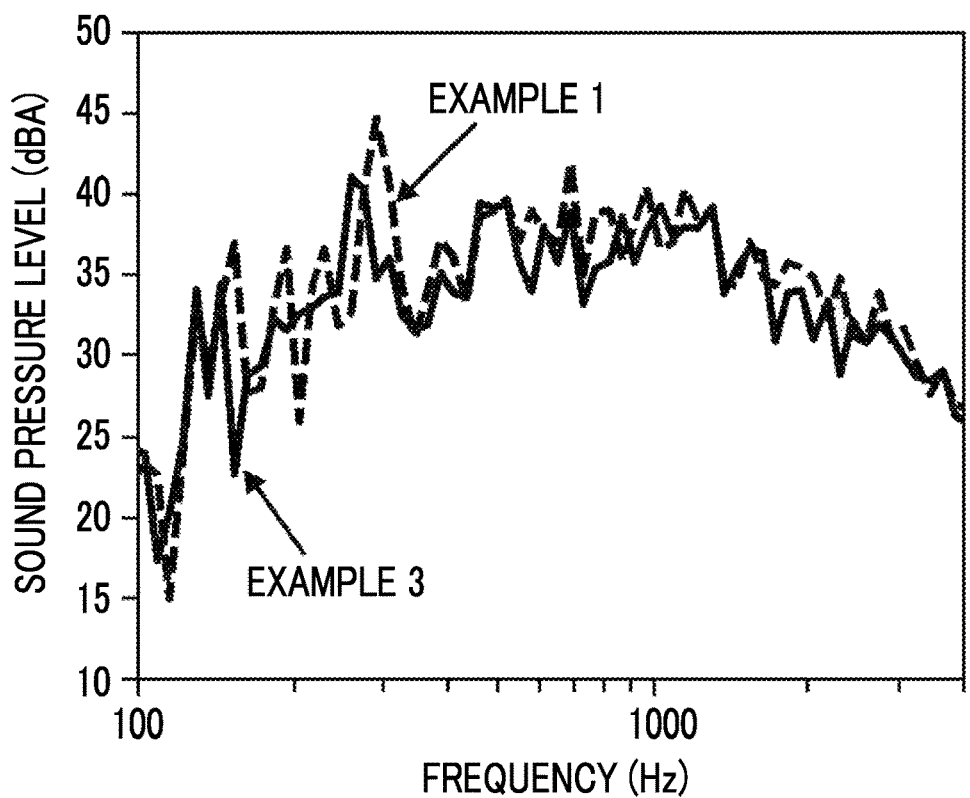
FIG. 25 is a diagram showing simulation results of sound pressure in each of Example 1 and Example 3.

FIG. 25 shows the measured spectra of the sound pressure level in Example 1 and the sound pressure level in Example 3 to which the tube body was attached. As can be seen from FIG. 25, by attaching the tube body, the expected effect can be obtained, and the sound pressure level can be reduced as a whole around the high peak.

As described above, Examples 1 to 3 are within the scope of the present invention, and in any of Examples 1 to 3, the noise from the internal sound source is silenced in a wide band on the low frequency side, so that the effect of the present invention is obvious.

EXPLANATION OF REFERENCES

10: air supply system
12: air supply system main body
14: housing
14a: intake port
14b: exhaust port
16: axial fan
16a: rotor
16b: rotating shaft
18: heat exchanger
30: silencing device
32: ventilation portion
34: resonance silencer
35: opening portion
36: first wall
36a: ventilation hole
37: second wall
37a: ventilation hole
38: side wall
39: insert
40: silencing body
40a: through-hole
52: air supply device
54: tube body
56: annular plate
58: sound absorbing urethane

What is claimed is:

1. A silencing device that is used in an air supply system having a housing, to silence noise generated from a sound source in the housing, the device comprising:

a resonance silencer provided at a position connected to a space in which the sound source is located within the air supply system,
wherein a distance by which the resonance silencer is separated from the sound source is less than λ/2, with λ being a resonance wavelength of the resonance silencer alone, and
a fundamental resonance frequency of the resonance silencer is equal to or less than an acoustic upper limit frequency of the housing,
a ventilation portion that allows air to be supplied in the air supply system to pass therethrough is provided,
the resonance silencer has an opening portion which is disposed at a position facing the ventilation portion, and
an inside of the resonance silencer communicates, through the opening portion, with the space in which the sound source is located.

2. The silencing device according to claim 1,
wherein first silencing, which is silencing by resonance of the resonance silencer, silences the noise, and the first silencing is fundamental resonance of the resonance silencer.

3. The silencing device according to claim 2,
wherein a portion of the resonance silencer that acts on the noise includes an end portion of the resonance silencer as a portion closest to the sound source,
the noise is silenced by the first silencing and a second silencing by interference of reflected sound produced by reflection of the noise by the resonance silencer with the noise in a region between the sound source and the end portion of the resonance silencer, and
a frequency of the second silencing is higher than a frequency of the first silencing.

4. The silencing device according to claim 1,
wherein an insert consisting of at least one of a foam material, a nonwoven fabric, or a porous material is disposed inside the resonance silencer.

5. The silencing device according to claim 1, further comprising:
a silencing body different from the resonance silencer.

6. The silencing device according to claim 5,
wherein a portion of the resonance silencer that acts on the noise includes an end portion of the resonance silencer as a portion closest to the sound source, and
the silencing body is disposed in a region between the sound source and the end portion of the resonance silencer.

7. The silencing device according to claim 5,
wherein the silencing body is formed of at least one of a foam material, a nonwoven fabric, or a porous material.

8. The silencing device according to claim 5,
wherein the silencing body is disposed on an outside of the ventilation portion.

9. An air supply system comprising:
an air supply system main body including the sound source inside a housing; and
the silencing device according to claim 1.

10. The air supply system according to claim 9,
wherein the air supply system main body supplies air by rotation of a rotating body.

11. The air supply system according to claim 10,
wherein noise generated from the sound source in the housing includes noise caused by the rotation of the rotating body.

12. The air supply system according to claim 9,
wherein the air supply system main body takes in air from a first end side of the air supply system main body and discharges air on a second end side of the air supply system main body, and
the silencing device is disposed at least on the second end side out of a first end and a second end of the air supply system main body.

13. The air supply system according to claim 12,
wherein the silencing device is disposed on each of the first end side and the second end side of the air supply system main body.

14. The air supply system according to claim 9,
wherein the air supply system main body further includes a rotor of an axial fan,
and
an area of a cross section of the ventilation portion perpendicular to a rotating shaft of the axial fan is smaller than an area of a circle surrounded by a trajectory through which a blade tip of the rotor farthest away from the rotating shaft passes during rotation of the axial fan.

15. The air supply system according to claim 9,
wherein a portion of the resonance silencer that acts on the noise includes an end portion of the resonance silencer as a portion closest to the sound source,
the air supply system main body further includes a rotor of an axial fan,
the silencing device includes a silencing body different from the resonance silencer, and
the silencing body is closer to the rotor than the end portion of the resonance silencer.

16. The air supply system according to claim 9,
wherein the air supply system main body is a blower.

17. The air supply system according to claim 16,
wherein a heat exchanger is provided in the air supply system main body.

18. The air supply system according to claim 9,
wherein the air supply system main body further includes a rotor of an axial fan,
the resonance silencer is an air column resonance type resonator having the opening portion,
the silencing device has a first end wall and a second end wall disposed opposite to each other in an axial direction of a rotating shaft of the axial fan,
a ventilation hole is provided in a central portion of each of the first end wall and the second end wall,
a peripheral portion of the ventilation hole in the second end wall is recessed to a first end wall side,
a silencing body formed of at least one of a foam material, a nonwoven fabric, or a porous material is disposed in a recess portion formed by the recessed peripheral portion of the ventilation hole in the second end wall, and
the silencing body is closer to the rotor than the opening portion.

* * * * *